(12) United States Patent
Yoshioka et al.

(10) Patent No.: US 6,598,128 B1
(45) Date of Patent: Jul. 22, 2003

(54) MICROPROCESSOR HAVING IMPROVED MEMORY MANAGEMENT UNIT AND CACHE MEMORY

(75) Inventors: Shinich Yoshioka, San Jose, CA (US); David Shepherd, Cupertino, CA (US); Rajesh Chopra, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/410,567

(22) Filed: Oct. 1, 1999

(51) Int. Cl.[7] ............................................... G06F 12/00
(52) U.S. Cl. ...................... 711/144; 711/143; 710/306
(58) Field of Search ................................ 711/3, 6, 128, 711/141, 143, 144, 145, 146, 206, 203, 215, 221; 710/306

(56) References Cited

U.S. PATENT DOCUMENTS

| | | |
|---|---|---|
| 4,332,010 A | 5/1982 | Messina et al. |
| 4,400,770 A | 8/1983 | Chan et al. |
| 4,724,517 A | 2/1988 | May |
| 4,797,814 A | 1/1989 | Brenza |
| 4,814,981 A | 3/1989 | Rubinfeld |
| 4,873,629 A | 10/1989 | Harris et al. |

(List continued on next page.)

FOREIGN PATENT DOCUMENTS

| | | |
|---|---|---|
| EP | 0165600 B1 | 11/1991 |
| EP | 0636976 B1 | 2/1995 |

(List continued on next page.)

OTHER PUBLICATIONS

Richard York; Real Time Debug for System–on–Chip Devices; Jun. 1999; pp. 1–6.
Transputer Instruction Set; 1988; INMOS Ltd.

*Primary Examiner*—Matthew Kim
*Assistant Examiner*—Matthew D. Anderson
(74) *Attorney, Agent, or Firm*—Loudermilk & Associates

(57) ABSTRACT

Methods of maintaining cache coherency of a virtual cache memory system in a data processing system are disclosed. The entries of the virtual cache memory include physical address information and logical address information. A memory access operation may be initiated on one or more predetermined memory locations based on physical address information. A determination may be made if the memory access operation may involve cache coherent memory. If the memory access operation may involve cache coherent memory, then a cache coherency command may be issued that contains physical address information of the memory access operation. Based on the cache coherency command and the physical address information, a determination may be made if there is a match between the physical address information of the memory access operation and the physical address information stored in the virtual cache. If there is a match, then a determination may be made whether data associated with the particular entry of the virtual cache memory is dirty. If the data associated with the particular entry of the virtual cache memory is dirty, then a write back operation may be initiated, and data in the particular entry of the virtual cache memory may be written to memory. A command may then be issued that indicates that the virtual cache memory and the memory locations of the memory access operation are cohered, and the memory access operation may be completed. A determination also may be made whether the memory access operation is a write operation. If the memory access operation is a write operation, then the particular entry of the virtual cache memory may be invalidated. The virtual cache memory may be included in a single chip microprocessor, and a device external to the single chip microprocessor may initiate the memory access operation. A circuit that bridges between the external device and an internal bus may receive a command from the external device to initiate the memory access operation.

20 Claims, 28 Drawing Sheets

U.S. PATENT DOCUMENTS

| | | | |
|---|---|---|---|
| 4,926,317 A | 5/1990 | Wallach et al. | |
| 5,148,538 A | 9/1992 | Celtruda et al. | |
| 5,251,311 A | 10/1993 | Kasai | |
| 5,386,565 A | 1/1995 | Tanaka et al. | |
| 5,404,482 A * | 4/1995 | Stamm et al. | 711/145 |
| 5,423,050 A | 6/1995 | Taylor et al. | |
| 5,434,804 A | 7/1995 | Bock et al. | |
| 5,440,705 A | 8/1995 | Wang et al. | |
| 5,448,576 A | 9/1995 | Russell | |
| 5,452,432 A | 9/1995 | Macachor | |
| 5,455,936 A | 10/1995 | Maemura | |
| 5,479,630 A * | 12/1995 | Killian | 711/3 |
| 5,479,652 A | 12/1995 | Dreyer et al. | |
| 5,483,518 A | 1/1996 | Whetsel | |
| 5,488,688 A | 1/1996 | Gonzales et al. | |
| 5,530,965 A | 6/1996 | Kawasaki et al. | |
| 5,570,375 A | 10/1996 | Tsai et al. | |
| 5,590,354 A | 12/1996 | Klapproth et al. | |
| 5,596,734 A | 1/1997 | Ferra | |
| 5,598,551 A | 1/1997 | Barajas et al. | |
| 5,608,881 A | 3/1997 | Masumura et al. | |
| 5,613,153 A | 3/1997 | Arimilli et al. | |
| 5,623,626 A | 4/1997 | Morioka et al. | |
| 5,627,842 A | 5/1997 | Brown et al. | |
| 5,657,273 A | 8/1997 | Ayukawa et al. | |
| 5,682,545 A | 10/1997 | Kawasaki et al. | |
| 5,704,034 A | 12/1997 | Circello | |
| 5,708,773 A | 1/1998 | Jeppesen, III et al. | |
| 5,724,549 A | 3/1998 | Selgas et al. | |
| 5,737,516 A | 4/1998 | Circello et al. | |
| 5,751,621 A | 5/1998 | Arakawa | |
| 5,768,152 A | 6/1998 | Battaline et al. | |
| 5,771,240 A | 6/1998 | Tobin et al. | |
| 5,774,701 A | 6/1998 | Matsui et al. | |
| 5,778,237 A | 7/1998 | Yamamoto et al. | |
| 5,781,558 A | 7/1998 | Inglis et al. | |
| 5,796,978 A | 8/1998 | Yoshioka et al. | |
| 5,822,619 A | 10/1998 | Sidwell | |
| 5,828,825 A | 10/1998 | Eskandari et al. | |
| 5,832,248 A | 11/1998 | Kishi et al. | |
| 5,835,963 A | 11/1998 | Yoshioka et al. | |
| 5,848,247 A | 12/1998 | Matsui et al. | |
| 5,859,789 A | 1/1999 | Sidwell | |
| 5,860,127 A | 1/1999 | Shimazaki et al. | |
| 5,862,387 A | 1/1999 | Songer et al. | |
| 5,867,726 A | 2/1999 | Ohsuga et al. | |
| 5,875,355 A | 2/1999 | Sidwell et al. | |
| 5,884,092 A | 3/1999 | Kiuchi et al. | |
| 5,896,550 A | 4/1999 | Wehunt et al. | |
| 5,903,911 A * | 5/1999 | Gaskins | 711/141 |
| 5,907,867 A | 5/1999 | Shinbo et al. | |
| 5,918,045 A | 6/1999 | Nishii et al. | |
| 5,930,523 A | 7/1999 | Kawasaki et al. | |
| 5,930,833 A | 7/1999 | Yoshioka et al. | |
| 5,944,841 A | 8/1999 | Christie | |
| 5,950,012 A | 9/1999 | Shiell et al. | |
| 5,953,538 A | 9/1999 | Duncan et al. | |
| 5,956,477 A | 9/1999 | Ranson et al. | |
| 5,978,874 A | 11/1999 | Singhal et al. | |
| 5,978,902 A | 11/1999 | Mann | |
| 5,983,017 A | 11/1999 | Kemp et al. | |
| 5,983,379 A | 11/1999 | Warren | |
| 6,412,043 B1 * | 6/2002 | Chopra et al. | 711/118 |

FOREIGN PATENT DOCUMENTS

| | | |
|---|---|---|
| EP | 0636976 A1 | 2/1995 |
| EP | 0652516 A1 | 5/1995 |
| EP | 0702239 A2 | 3/1996 |
| EP | 0720092 A1 | 7/1996 |
| EP | 0933926 A1 | 8/1999 |
| EP | 0945805 A1 | 9/1999 |
| EP | 0959411 A1 | 11/1999 |
| JP | 9602819 | 9/1996 |
| JP | 08320796 A | 12/1996 |
| JP | 08329687 A | 12/1996 |
| JP | 09212358 A | 8/1997 |
| JP | 9311786 A | 12/1997 |
| JP | 10106269 A | 4/1998 |
| JP | 10124484 A | 5/1998 |
| JP | 10177520 A | 6/1998 |

* cited by examiner

| MMU | MD | r | BL | STEP | WATCH | r | ASID | FD | FR | SZ | PR | r | M | Q | IMASK | r | S | r |
|---|---|---|---|---|---|---|---|---|---|---|---|---|---|---|---|---|---|---|
| 31 | 30 | 29 | 28 | 27 | 26 | 25 24 | 23 16 | 15 | 14 | 13 | 12 | 11 10 | 9 | 8 | 7 4 | 3 2 | 1 | 0 |

| 64-neff bits | neff-12 bits | 2 | 8 | 1 | 1 |
|---|---|---|---|---|---|
| r | EPN | r | ASID | SH | V |

FIG. 4A

| 64-nphys bits | nphys-12 bits | 2 | 4 | 1 | 2 | 1 | 2 |
|---|---|---|---|---|---|---|---|
| r | PPN | r | PR | r | SZ | r | CB |

FIG. 4B

| State | Description |
|---|---|
| PTEH<br>PTEH.EPN<br>PTEH.ASID<br>PTEH.SH<br>PTEH.V | Page table entry high<br>Effective page number<br>Address space identifier<br>Share page flag<br>PTE enable |
| PTEL<br>PTEL.PPN<br>PTEL.PR<br>PTEL.SZ<br>PTEL.CB | Page table entry low<br>Physical page number<br>Protection information<br>Page size<br>Cache behavior information |

FIG. 4C

| Name of field | Size in bits | Behavior |
| --- | --- | --- |
| PTEH.V | 1 | If 0: the PTE is disabled<br>If 1: the PTE is enabled |

FIG. 5A

| Name of field | Size in bits | Behavior |
| --- | --- | --- |
| PTEL.SZ | 2 | Distinguishes up to 4 supported page sizes. |

FIG. 5B

| PTEL.SZ | Page size |
| --- | --- |
| 0x0 | 4 kbytes |
| 0x1 | 64 kbytes |
| 0x2 | 1 Mbytes |
| 0x3 | 512 Mbytes |

FIG. 5C

| Name of field and size | PTEL.CB value | Behavior with a unified PTE array | | Behavior with a unified PTE array | |
|---|---|---|---|---|---|
| | | Instruction fetch | Data access | Instruction fetch | Data access |
| PTEL.CB 2 bits | 0x0 | uncachable | uncachable | uncachable | uncachable |
| | 0x1 | uncachable | device | RESERVED | device |
| | 0x2 | cachable | cachable, write-back | cachable | cachable, write-back |
| | 0x3 | cachable | cachable, write-through | RESERVED | cachable, write-through |

FIG. 5D

| Name of field and size | Bit number of PTEL.PR | Value of bit | Interpretation with a unified PTE array | Interpretation with a split PTE array - Instruction side | Interpretation with a split PTE array - Data side |
|---|---|---|---|---|---|
| PTEL.PR 4 bits | 0 (R) | 0 | not readable | MUST SET TO 0 | not readable |
| | | 1 | readable | RESERVED | readable |
| | 1 (X) | 0 | not executable | not executable | MUST SET TO 0 |
| | | 1 | executable | executable | RESERVED |
| | 2 (W) | 0 | not writable | MUST SET TO 0 | not writable |
| | | 1 | writable | RESERVED | writable |
| | 3 (U) | 0 | privileged only | privileged only | privileged only |
| | | 1 | user accessible | user accessible | user accessible |

FIG. 5E

| Page size | Number of bits in PPN |
|---|---|
| 4 kbytes | 20 |
| 64 kbytes | 16 |
| 1 Mbyte | 12 |
| 512 Mbytes | 3 |

FIG. 5F

| Name of field | Size in bits | Behavior |
|---|---|---|
| PTEH.SH | 1 | If 0: the page is not shared |
| | | If 1: the page is shared |

FIG. 5G

| Name of field | Size in bits | Behavior |
|---|---|---|
| PTEH.ASID | 8 | Distinguishes up to 256 different effective address spaces |

FIG. 5H

| Page size | Number of bits in EPN |
|---|---|
| 4 kbytes | 20 |
| 64 kbytes | 16 |
| 1 Mbyte | 12 |
| 512 Mbytes | 3 |

FIG. 5I

| ICCR0 | | | CFG | 0x01600000 | |
|---|---|---|---|---|---|
| Field | Bits | Size | Volatile? | Synopsis | Type |
| ICE | 0 | 1 | No | Instruction cache enable | RW |
| | Operation | | | If 0: instruction caching is disabled<br>If 1: instruction cache is enabled | |
| | When read | | | Returns current value | |
| | When written | | | Updates current value | |
| | Power-on reset | | | Undefined | |
| ICI | 1 | 1 | No | Instruction cache invalidate | OTHER |
| | Operation | | | Write with 1 to invalidate the entire instruction cache | |
| | When read | | | Returns 0 | |
| | When written | | | Write of 0: no effect<br>Write of 1: invalidate the entire instruction cache<br>Writes have no effect on the value of this field | |
| | Power-on reset | | | 0 | |
| RES | [2,63] | 62 | No | RESERVED | RES |
| | Operation | | | Software should always write 0 to these bits.<br>Software should always ignore the value read from these bits. | |
| | When read | | | Reads as 0 (behavior of other implementations may vary) | |
| | When written | | | Writes ignored (behavior of other implementations may vary) | |
| | HARD reset | | | 0 (behavior of other implementations may vary) | |

FIG. 7A

| ICCR1 | | | CFG | 0x01600001 | |
|---|---|---|---|---|---|
| Field | Bits | Size | Volatile? | Synopsis | Type |
| IW_LOAD | [0,4] | 5 | No | Instruction way load | RW |
| | Operation | | Chooses instruction cache way for PREFI when IW_LE is set. The value of IW_LOAD is used to index into the way array. It | | |
| | When read | | Returns current value | | |
| | When written | | Updates current value. Values in the range [0,3] select one of the 4 Ways in the instruction cache. Values in the range [4,31] are reserved and must not be written. | | |
| | Power-on reset | | Undefined | | |
| IW_LE | 7 | 1 | No | Instruction way load enable | RW |
| | Operation | | If 0: PREFI data goes to way selected by replacement algorithm. If 1: PREFI data goes to way selected by IW_LOAD | | |
| | When read | | Returns current value | | |
| | When written | | Updates current value | | |
| | Power-on reset | | Undefined | | |
| IW_LOCK | [8,39] | 32 | No | Instruction way lock | RW |
| | Operation | | Bit w of IW_LOCK is the lock bit for way w in the instruction cache. If bit w is 0, way w of the instruction cache is unlocked. If bit w is 1, way w of the instruction cache is locked. The values [0,15] distinguish different lock patterns for the 4 ways. All other values are reserved and must not be written. | | |
| | When read | | Returns current value | | |
| | When written | | Updates current value | | |
| | Power-on reset | | Undefined | | |
| RES | [5,6] [40,63] | 26 | No | RESERVED | RES |
| | Operation | | Software should always write 0 to these bits. Software should always ignore the value read from these bits. | | |
| | When read | | Reads as 0 (behavior of other implementations may vary) | | |
| | When written | | Writes ignored (behavior of other implementations may vary) | | |
| | HARD reset | | 0 (behavior of other implementations may vary) | | |

FIG. 7B

| ICACHETAG0[w,i] where w is in the range [0,3] and i is in the range [0,255] | CFG | 0x01000000 + (65536 * w ) + (16 * i ) | | |
|---|---|---|---|---|
| Field | Bits | Size | Volatile? | Synopsis | Type |
| V | 0 | 1 | Yes | Valid bit | OTHER |
| | Operation | | | If 0: the cache block is invalid<br>If 1: the cache block is valid | |
| | When read | | | Returns current value | |
| | When written | | | A write to this register may lead to undefined behavior | |
| | Power-on reset | | | Undefined | |
| SH | 1 | 1 | Yes | Shared bit | OTHER |
| | Operation | | | If 0: the cache block is not shared<br>If 1: the cache block is shared<br>This field is a copy of the associated PTEH.SH | |
| | When read | | | Returns current value | |
| | When written | | | A write to this register may lead to undefined behavior | |
| | Power-on reset | | | Undefined | |
| ASID | [2,9] | 8 | Yes | Address space identifier | OTHER |
| | Operation | | | Identifies the address space identifier for this cache block<br>This field is a copy of the associated PTEH.ASID | |
| | When read | | | Returns current value | |
| | When written | | | A write to this register may lead to undefined behavior | |
| | Power-on reset | | | Undefined | |
| EADDR | [12,31] | 20 | Yes | Effective address tag | OTHER |
| | Operation | | | Identifies the effective address tag for this cache block<br>Bit 12 always reads as zero for SH5 | |
| | When read | | | Returns current value | |
| | When written | | | A write to this register may lead to undefined behavior | |
| | Power-on reset | | | Undefined | |

FIG. 7C/1

| ICACHETAG0[w,i] where w is in the range [0,3] and i is in the range [0,255] | CFG | 0x01000000 + (65536 * w ) + (16 * i ) | |
|---|---|---|---|
| Field | Bits | Size | Volatile? | Synopsis | Type |

| Field | Bits | Size | Volatile? | Synopsis | Type |
|---|---|---|---|---|---|
| PRU | 55 | 1 | Yes | Access protection | OTHER |
| | Operation | | | If 0: the cache block is accessible to just privileged mode If 1: the cache block is accessible to user and privileged mode This field is a copy of the associated PTELPR.U | |
| | When read | | | Returns current value | |
| | When written | | | A write to this register may lead to undefined behavior | |
| | Power-on reset | | | Undefined | |
| LRU | [58,63] | 6 | Yes | Replacement information | OTHER |
| | Operation | | | This field contains the replacement information for a set. All cache blocks in the same set are associated with the same LRU state. | |
| | When read | | | Returns current value | |
| | When written | | | A write to this register may lead to undefined behavior | |
| | Power-on reset | | | Undefined | |
| RES | [10,11] [32,54] [56,57] | 27 | No | RESERVED | RES |
| | Operation | | | Software should always ignore the value read from these bits. | |
| | When read | | | Reads as 0 (behavior of other implementations may vary) | |
| | When written | | | A write to this register may lead to undefined behavior | |
| | Power-on reset | | | 0 (behavior of other implementations may vary) | |

FIG. 7C/2

| ICACHEDATA[w,i,r] where w is in the range [0,3] and i is in the range [0,255] and r is in the range [0,3] | CFG | 0x01200000 + (65536 * w ) + (16 * i ) + r | | |
|---|---|---|---|---|
| Field | Bits | Size | Volatile? | Synopsis | Type |
| DATA | [0,63] | 64 | Yes | Instruction cache data | OTHER |
| | Operation | | This register contains 64 bits of data corresponding to the $r^{th}$ element of the 32 byte cache block | | |
| | When read | | Returns current value | | |
| | When written | | A write to this register may lead to undefined behavior | | |
| | Power-on reset | | Undefined | | |

FIG. 7D

| OCCR0 | | | CFG | 0x01E00000 | |
|---|---|---|---|---|---|
| Field | Bits | Size | Volatile? | Synopsis | Type |
| OCE | 0 | 1 | No | Operand cache enable | RW |
| | Operation | | | If 0: instruction caching is disabled<br>If 1: instruction cache is enabled | |
| | When read | | | Returns current value | |
| | When written | | | Updates current value | |
| | Power-on reset | | | Undefined | |
| OCI | 1 | 1 | No | Operand cache invalidate | OTHER |
| | Operation | | | Write with 1 to invalidate the entire operand cache | |
| | When read | | | Returns 0 | |
| | When written | | | Write of 0: no effect<br>Write of 1: invalidate the entire operand cache<br>Writes have no effect on the value of this field | |
| | Power-on reset | | | Undefined | |
| OWT | 2 | 1 | No | Operand cache write-through mode | RW |
| | Operation | | | If 0: write-through and write-back are distinguished my MMU<br>If 1: write-back is implemented as write-through | |
| | When read | | | Returns current value | |
| | When written | | | Updates current value | |
| | Power-on reset | | | Undefined | |
| RES | [3,63] | 61 | No | RESERVED | RES |
| | Operation | | | Software should always write 0 to these bits.<br>Software should always ignore the value read from these bits. | |
| | When read | | | Reads as 0 (behavior of other implementations may vary) | |
| | When written | | | Writes ignored (behavior of other implementations may vary) | |
| | Power-on reset | | | 0 (behavior of other implementations may vary) | |

FIG. 7E

| OCCR1 | | | CFG | 0x01E00001 | |
|---|---|---|---|---|---|
| Field | Bits | Size | Volatile? | Synopsis | Type |
| OW_LOAD | [0,4] | 5 | No | Operand way load | RW |
| | Operation | | | Chooses operand cache way for PREFO when OW_LE is set. The value of OW_LOAD is used to index into the way array. It does not contain a bit per way. | |
| | When read | | | Returns current value | |
| | When written | | | Updates current value. Values in the range [0,3] select one of the 4 ways in the operand cache. Values in the range [4,31] are reserved and must not be written. | |
| | Power-on reset | | | Undefined | |
| OW_LE | 7 | 1 | No | Operand way load enable | RW |
| | Operation | | | If 0: PREFO data goes to way selected by replacement algorithm. If 1: PREFO data goes to way selected by OW_LOAD | |
| | When read | | | Returns current value | |
| | When written | | | Updates current value | |
| | Power-on reset | | | Undefined | |
| OW_LOCK | [8,39] | 32 | No | Operand way lock | RW |
| | Operation | | | Bit w of OW_LOCK is the lock bit for way w in the operand cache. If bit w is 0, way w of the operand cache is unlocked. If bit w is 1, way w of the operand cache is locked. The values [0,15] distinguish different lock patterns for the 4 ways. All other values are reserved and must not be written. | |
| | When read | | | Returns current value | |
| | When written | | | Updates current value | |
| | Power-on reset | | | Undefined | |
| RES | [5,6] [40,63] | 26 | No | RESERVED | RES |
| | Operation | | | Software should always write 0 to these bits. Software should always ignore the value read from these bits. | |
| | When read | | | Reads as 0 (behavior of other implementations may vary) | |
| | When written | | | Writes ignored (behavior of other implementations may vary) | |
| | HARD Reset | | | 0 (behavior of other implementations may vary) | |

FIG. 7F

| OCACHETAG0[w,i] where w is in the range [0,3] and i is in the range [0,255] | CFG | 0x01800000 + (65536 * w) + (16 * i) | |
|---|---|---|---|
| Field | Bits | Size | Volatile? | Synopsis | Type |

| Field | Bits | Size | Volatile? | Synopsis | Type |
|---|---|---|---|---|---|
| V | 0 | 1 | Yes | Valid bit | OTHER |
| | Operation | | | If 0: the cache block is invalid<br>If 1: the cache block is valid | |
| | When read | | | Returns current value | |
| | When written | | | A write to this register may lead to undefined behavior | |
| | Power-on reset | | | Undefined | |
| SH | 1 | 1 | Yes | Shared bit | OTHER |
| | Operation | | | If 0: the cache block is not shared<br>If 1: the cache block is shared<br>This field is a copy of the associated PTEH.SH | |
| | When read | | | Returns current value | |
| | When written | | | A write to this register may lead to undefined behavior | |
| | Power-on reset | | | Undefined | |
| ASID | [2,9] | 8 | Yes | Address space identifier | OTHER |
| | Operation | | | Identifies the address space identifier for this cache block<br>This field is a copy of the associated PTEH.ASID | |
| | When read | | | Returns current value | |
| | When written | | | A write to this register may lead to undefined behavior | |
| | Power-on reset | | | Undefined | |
| EADDR | [12,31] | 20 | Yes | Effective address tag | OTHER |
| | Operation | | | Identifies the effective address tag for this cache block<br>Bit 12 always reads as zero for SH5 | |
| | When read | | | Returns current value | |
| | When written | | | A write to this register may lead to undefined behavior | |
| | Power-on reset | | | Undefined | |

FIG. 7G/1

| Field | Bits | Size | Volatile? | Synopsis | Type |
|---|---|---|---|---|---|
| \multicolumn{6}{l}{OCACHETAG0[w,i] where w is in the range [0,3] and i is in the range [0,255]} CFG  0x01800000 + (65536 * w) + (16 * i) | | | | | |
| PRR | 52 | 1 | Yes | Read protection | OTHER |
| | Operation | | | If 0: the cache block is non-readable<br>If 1: the cache block is readable<br>This field is a copy of the associated PTEL.PR.R | |
| | When read | | | Returns current value | |
| | When written | | | A write to this register may lead to undefined behavior | |
| | Power-on reset | | | Undefined | |
| PRW | 54 | 1 | Yes | Write protection | OTHER |
| | Operation | | | If 0: the cache block is non-writable<br>If 1: the cache block is writable<br>This field is a copy of the associated PTEL.PR.W | |
| | When read | | | Returns current value | |
| | When written | | | A write to this register may lead to undefined behavior | |
| | Power-on reset | | | Undefined | |
| PRU | 55 | 1 | Yes | Access protection | OTHER |
| | Operation | | | If 0: the cache block is accessible to just privileged mode<br>If 1: the cache block is accessible to user and privileged mode<br>This field is a copy of the associated PTEL.PR.U | |
| | When read | | | Returns current value | |
| | When written | | | A write to this register may lead to undefined behavior | |
| | Power-on reset | | | Undefined | |
| WT | 56 | 1 | Yes | Write-through/write-back bit | OTHER |
| | Operation | | | If 0: the cache block is in write-back mode<br>If 1: the cache block is in write-through mode<br>This field is a copy of the associated PTEL.CB | |
| | When read | | | Returns current value | |
| | When written | | | A write to this register may lead to undefined behavior | |
| | Power-on reset | | | Undefined | |

FIG. 7G/2

| OCACHETAG0[w,i] where w is in the range [0,3] and i is in the range [0,255] | | | CFG | 0x01800000 + (65536 * w ) + (16 * i ) | |
|---|---|---|---|---|---|
| Field | Bits | Size | Volatile? | Synopsis | Type |
| U | 57 | 1 | Yes | Line dirty bit | OTHER |
| | Operation | | | If 0: the cache block is clean<br>If 1: the cache block is dirty | |
| | When read | | | Returns current value | |
| | When written | | | A write to this register may lead to undefined behavior | |
| | Power-on reset | | | Undefined | |
| LRU | [58,63] | 6 | Yes | Replacement information | OTHER |
| | Operation | | | This field contains the replacement information for a set. All cache blocks in the same set are associated with the same LRU state. | |
| | When read | | | Returns current value | |
| | When written | | | A write to this register may lead to undefined behavior | |
| | Power-on reset | | | Undefined | |
| RES | [10,11]<br>[32,51]<br>53 | 23 | No | RESERVED | RES |
| | Operation | | | Software should always ignore the value read from these bits. | |
| | When read | | | Reads as 0 (behavior of other implementations may vary) | |
| | When written | | | A write to this register may lead to undefined behavior | |
| | Power-on reset | | | 0 (behavior of other implementations may vary) | |

FIG. 7G/3

| OCACHETAG1[w,i] where w is in the range [0,3] and i is in the range [0,255] | CFG | 0x01B00001 + (65536 * w ) + (16 * i ) | | |
|---|---|---|---|---|
| Field | Bits | Size | Volatile? | Synopsis | Type |
| V | 0 | 1 | Yes | Valid bit | OTHER |
| | Operation | | | If 0: the cache block is invalid<br>If 1: the cache block is valid | |
| | When read | | | Returns current value | |
| | When written | | | A write to this register may lead to undefined behavior | |
| | Power-on reset | | | Undefined | |
| PADDR | [12,31] | 20 | Yes | Physical address tag | OTHER |
| | Operation | | | Identifies the physical address tag for this cache block<br>Bit 12 always reads as zero for SH5 | |
| | When read | | | Returns current value | |
| | When written | | | A write to this register may lead to undefined behavior | |
| | Power-on reset | | | Undefined | |
| RES | [1,11]<br>[32,63] | 43 | No | RESERVED | RES |
| | Operation | | | Software should always ignore the value read from these bits. | |
| | When read | | | Reads as 0 (behavior of other implementations may vary) | |
| | When written | | | A write to this register may lead to undefined behavior | |
| | Power-on reset | | | 0 (behavior of other implementations may vary) | |

FIG. 7H

| OCACHEDATA[w,i,r] where w is in the range [0,3] and i is in the range [0,255] and r is in the range [0,3] | CFG | 0x01A00000 + (65536 * w ) + (16 * i ) + r | |
|---|---|---|---|
| Field | Bits | Size | Volatile? | Synopsis | Type |
| DATA | [0,63] | 64 | Yes | Operand cache data | OTHER |
| | Operation | This register contains 64 bits of data corresponding to the $r^{th}$ element of the 32 byte cache block | | | |
| | When read | Returns current value | | | |
| | When written | A write to this register may lead to undefined behavior | | | |
| | Power-on reset | Undefined | | | |

FIG. 7I

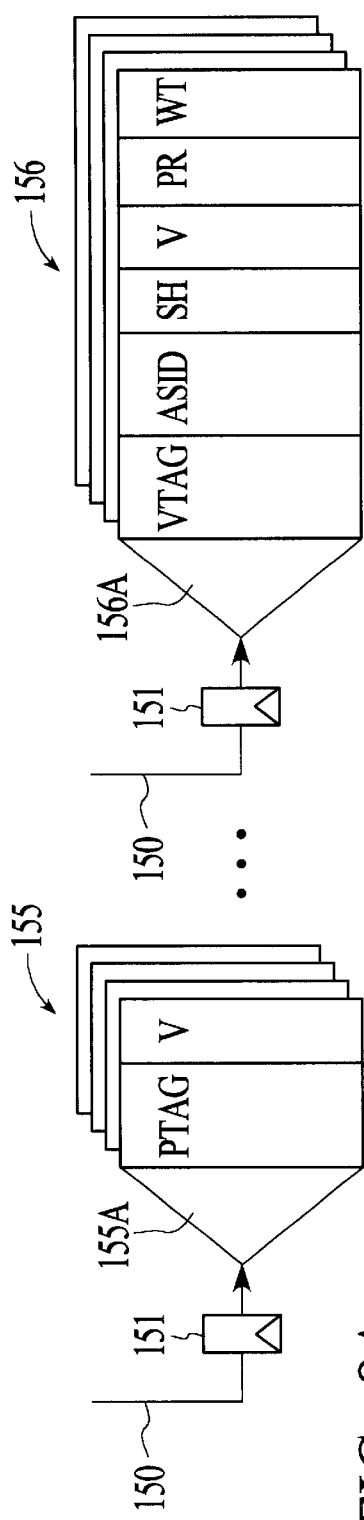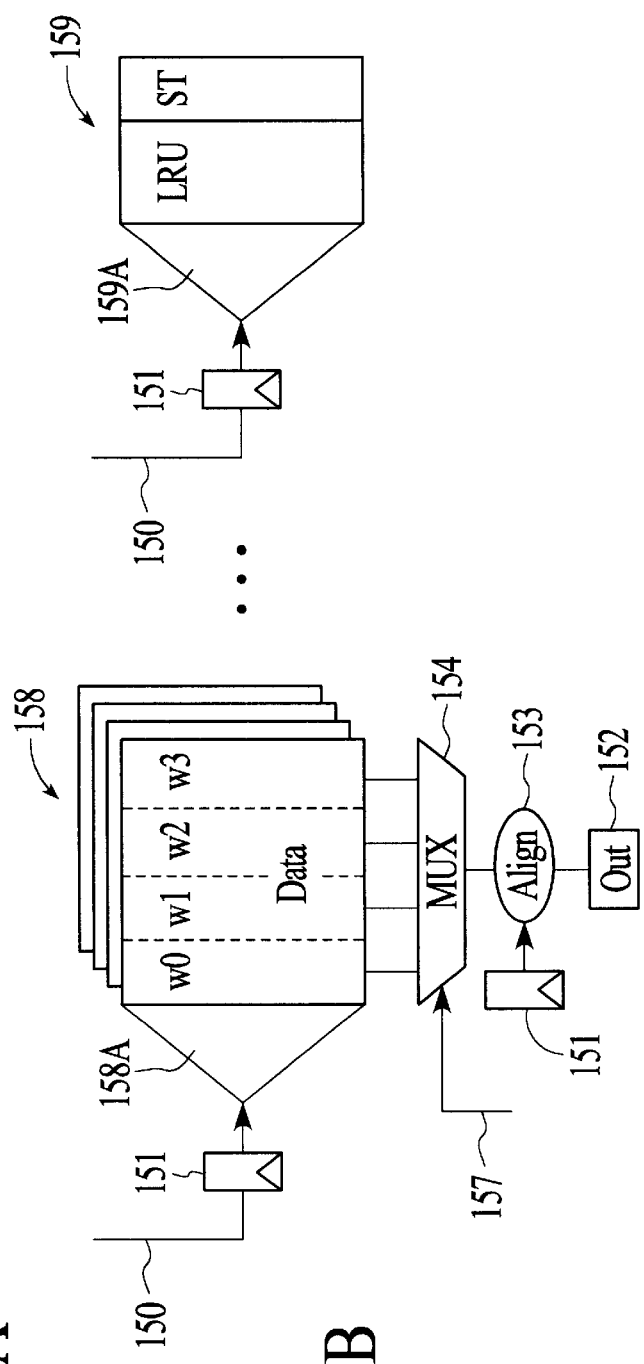
FIG. 8A
FIG. 8B

MICROPROCESSOR HAVING IMPROVED MEMORY MANAGEMENT UNIT AND CACHE MEMORY

FIELD OF THE INVENTION

The present invention relates to microprocessor and similar computing-type devices, and more particularly to microprocessors and similar computing-type devices with improved memory management and cache capabilities, particularly those that include virtual cache memories.

BACKGROUND OF THE INVENTION

Microprocessors, data processors, microcomputers, microcontrollers and other computing-type devices (herein generally referred to simply as "microprocessors") often are implemented to include a memory management units (MMU) and one or more cache memories. As is known in the art, the MMU typically improve microprocessor capabilities by managing the separation of logical or virtual address space (virtual memory) from physical address space (main memory), and often includes a translation lookaside buffer (TLB) or other resources to translate between logical and physical addresses. Also as is known in the art, a cache memory maintains a copy of the contents of the most recently accessed memory locations and is able to provide the data to the processor very quickly should any address in the cache be accessed again.

Caches generally are divided into three types: (1) physically indexed physically tagged (PIPT) (2) virtually indexed physically tagged (VIPT); and (3) virtually indexed virtually tagged (VIVT) or "virtual cache". The most commonly used cache configuration is the VIPT cache. In VIPT caches, the virtual address is used to select the index into the cache. The physical tag is then compared with part of the physical address, which is derived from the physical page number (PPN) and size information provided by the TLB. Virtual caches index into the cache using the virtual address (similar to VIPT caches), but the tag residing in the cache is also virtual. In case of a virtual tag match, the data is immediately returned without any TLB access. For this reason, virtual caches tend to have faster cache access times as compared to VIPT caches. Therefore, it often is possible to achieve higher frequencies with a virtual cache.

While the use of such virtual caches has been proposed (see U.S. Pat. No. 5,930,833, which is incorporated herein by reference), there are a number of issues that may arise. For example, virtual caches have very fast access time since they do not incur delays during the virtual-physical address translation. They do incur, however, tend to incur a consistency problem, often called the synonym problem. This is caused when two different virtual addresses point to a unique physical address, or the same virtual addresses with different process ID's point to a unique physical address. While U.S. Pat. No. 5,930,833 proposed certain strategies for dealing with the synonym problem and for otherwise improving microprocessors, the need exists for yet further improvements in microprocessors incorporating MMUs, TLBs, caches, virtual caches, etc.

SUMMARY OF THE INVENTION

The present invention provides microprocessors, and methods of operating microprocessors, utilizing improved MMUs, TLBs, caches and virtual caches. In accordance with the present invention, MMUs may be provided in a manner that the MMU may more readily be scaled to accommodate the development of later generation microprocessors. MMU resources preferably are accessed in a configuration register space separate from the physical and logical address spaces, and such MMU configuration registers are implemented in a manner to more readily accommodate future, scaled versions. Instructions to access, modify and control the MMU configuration register contents preferably are provided.

MMUs in accordance with preferred embodiments also provide particular linked behavior with the cache or virtual cache. In such preferred embodiments, the cache or virtual cache preferably is frozen and bypassed when the MMU is disabled, although certain instructions may yet access the cache configuration registers (the cache resources preferably also are accessed in the separate configuration register space).

MMUs in accordance with certain preferred embodiments also operate in a more optimal manner with virtual cache memories. As one illustrate example, permissions may be widened in the cache upon finding that the permission in the MMU/TLB is wider that the corresponding entry in the cache, and desirably the cache permission may automatically be widened.

Also in accordance with the present invention, the cache as well as the MMU may be provided in a manner to be more readily scalable to accommodate the development of later generation microprocessors. Cache resources also preferably are accessed in a configuration register space separate from the physical and logical address spaces, and such cache configuration registers are implemented in a manner to more readily accommodate future, scaled versions. Instructions to access, modify and control the cache configuration register contents preferably are provided.

In accordance with preferred embodiments, the MMU and cache is implemented in a manner to more readily enable versions with virtual and non-virtual cache designs.

In order to more optimally operate caches, microprocessors with caches, instructions are provided to enable cache locking and cache invalidate/flush/purge operation in a more desirable manner. In general, in accordance with the present invention, caches and in particular virtual caches may more be readily implemented, managed and controlled using configuration registers, cache control instructions and other implements as more described below.

Accordingly, the objects of the present invention include the provision of microprocessors having MMUs/TLBs/caches and/or virtual caches with the foregoing advantages and benefits, and as well as the advantages and benefits as will be disclosed in, and/or apparent from, the detailed description to be hereinafter set forth.

BRIEF DESCRIPTION OF THE DRAWINGS

The present invention may be more fully understood by a description of certain preferred embodiments in conjunction with the attached drawings in which:

FIGS. 4A to 4C and FIGS. 5A to 5I illustrate exemplary configuration registers for an MMU in accordance with preferred embodiments of the present invention;

FIGS. 7A to 7I illustrate exemplary configuration registers for virtual cache memory in accordance with preferred embodiments of the present invention;

FIGS. 8A and 8B illustrate an exemplary virtual cache arrays in accordance with preferred embodiments of the present invention;

DETAILED DESCRIPTION OF THE PREFERRED EMBODIMENTS

The present invention will be described in greater detail with reference to certain preferred embodiments and certain other embodiments, which may serve to further the understanding of preferred embodiments of the present invention. It should be understood that, as will be appreciated by those skilled in the art, certain features of the various embodiments disclosed herein may beneficially be used in combination with other such features (such as illustrated in the preferred embodiments, etc.), while certain features (such as of the MMU/TLB or cache/virtual cache) will have benefits and utility separate and apart from the overall combination(s) exemplified in the preferred embodiments. The use of such features apart from such combination is expressly contemplated to be within the scope of the inventions disclosed herein. It also is understood that certain exemplary preferred embodiments will be explained in terms of particular numeric quantities, such as the number of bits in addresses and instruction fields and registers and the like, cache, TLB and page sizes and the like, etc. It is understood that such preferred exemplary numeric attributes are in general not to be construed as particularly limiting the present invention to such numeric attributes.

Figure 1:
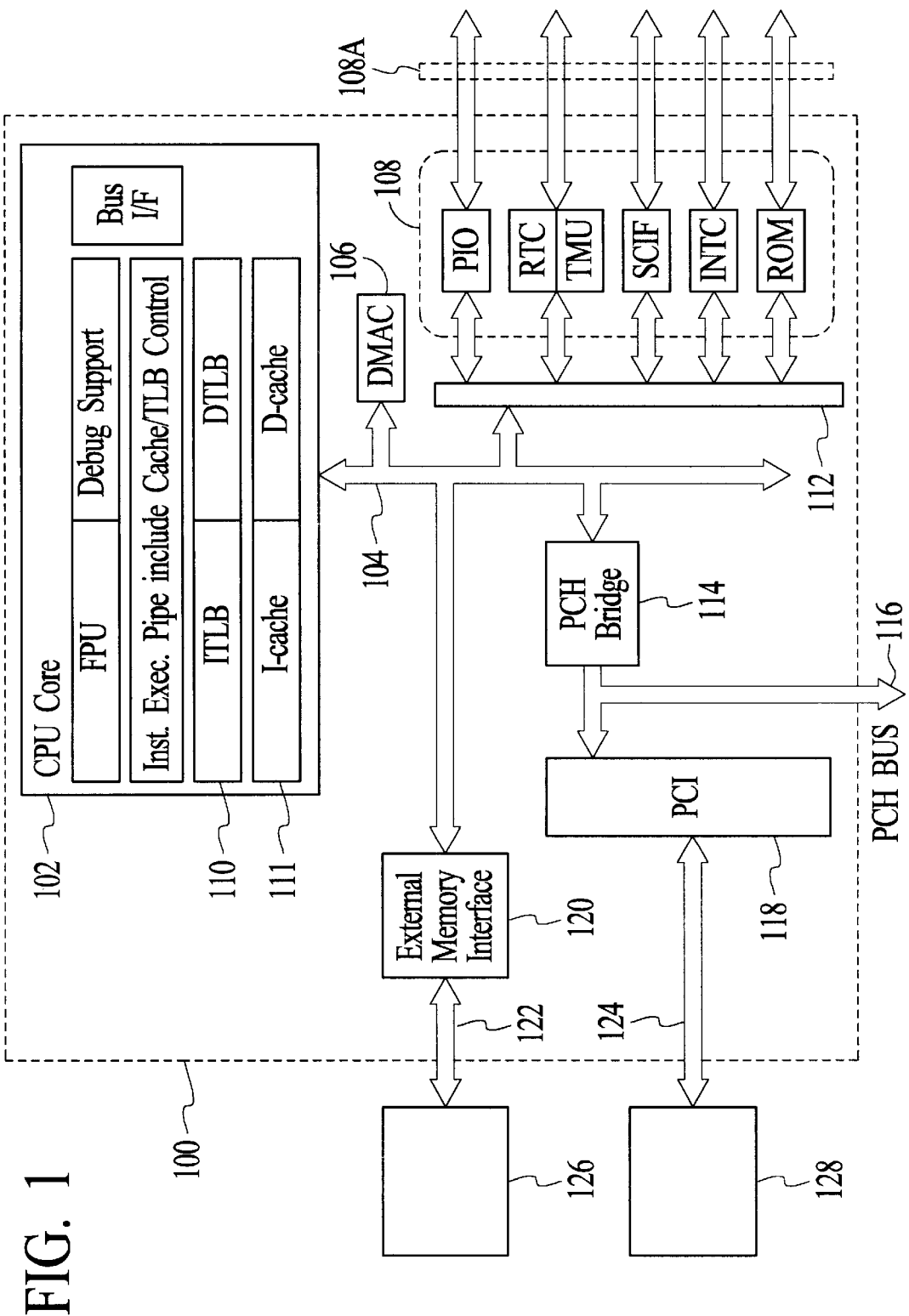
FIG. 1 is an exemplary block diagram of a CPU and computing system/data processor in accordance with preferred embodiments of the present invention.

Referring now to FIG. 1, processor 100 is illustrated, which preferably consists of a single chip microprocessor, although it may be implemented in more than one chip in other embodiments. Processor 100 includes CPU core 102, which includes, among other components, execution resources (such as instruction execution pipeline, arithmetic/logic units, general purpose and other registers, control logic, bus interface unit, etc.) and MMU 110 (preferably including a single TLB or multiple TLBs) and cache memory 111. It should be noted that, while FIG. 1 illustrates separate instruction and data TLBs and separate instruction and data caches, various embodiments of the present invention utilize other MMU/cache arrangements, as more fully described elsewhere herein. As will be appreciated by those skilled in the art, the components of CPU core 102 perform (or control the performance of) functions including fetching instructions and data from memory, preprocessing fetched instructions, ordering/scheduling instructions to be executed, executing the instructions and/or processing exceptions, managing memory transactions and interfacing with external circuit devices, including external memory, peripheral devices and the like.

CPU core 102 communicates with other components of processor 100 primarily through bus 104. In certain preferred embodiments, bus 104 consists of a high-speed network-type bus, preferably using packet-based data transfer technology is referred to herein as a "super highway." Bus 104, for example, couples CPU core 102 to direct memory access controller ("DMAC") 106, external memory interface/controller 120, PCH (peripheral component highway) bridge 114, and through peripheral bus 112 to various peripheral modules 108 (which include, as examples programmable input/output ("PIO") circuits, real time clock ("RTC"), timer unit ("TMU"), serial communication interface with FIFO ("SCIF"), interrupt controller ("INTC") and read only memory ("ROM")). As is known in the art, such peripheral modules communicate with external devices through I/O lines 108A. External memory devices (such as dynamic random access memory ("DRAM") preferably are coupled to external memory interface/controller 120 via memory bus 122. External device(s) 128, preferably of what is known as PCI-type (peripheral component interconnect) devices (PCI-type devices being only exemplary), are coupled to interface 118 (again; preferably a PCI-type interface) over bus 124. It should be noted that external memory 126 may be sometimes referred to as "main memory," and it also should be noted that some or all of such main memory could be implemented on the same chip as CPU core 102 and/or in external memory.

It should be noted that the overall system layout of FIG. 1 is exemplary. In particular, it should be noted that, in alternative embodiments, PCH bus 116 and PCH bridge 114 are not present, and instead element 118 is, in effect, a PCI bridge-type device bridging between bus 104 and PCI bus 124, to which is connected one or a plurality of PCI-type devices (such as device 128). Other variants within the scope of the present invention include (preferably) external or internal ROM (or FLASH-type memory) that is coupled to bus 104 through a separate interface (which may in place of, or in addition to, the ROM of peripheral modules 108. Such variants are also within the scope of the present invention.

Figures 2, 3A:
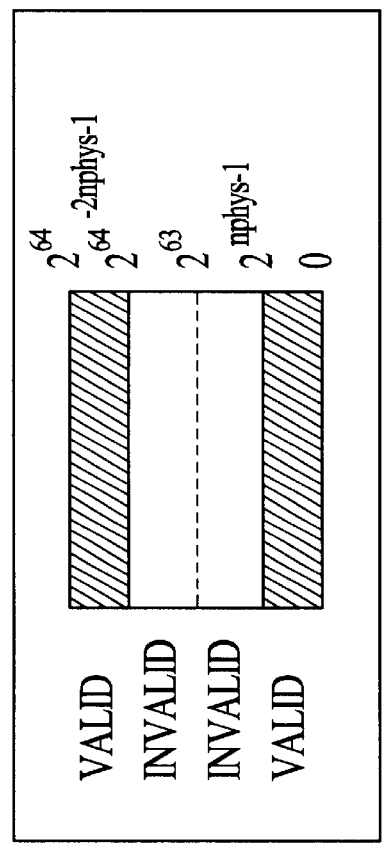
FIG. 2 illustrates an exemplary status register utilized in preferred embodiments of a CPU in accordance with the present invention.
FIGS. 3A to 3C illustrate exemplary physical address space, logical address and configuration address space utilized in preferred embodiments of the present invention.

CPU core 102, as with other CPU cores known in the art, execute instructions to perform a wide variety of desired function. Such CPU cores typically include a status register ("SR"), which is a control register that generally contains fields that control or influence the behavior of instructions then being executed by the CPU core. An exemplary layout of an SR utilized in certain preferred embodiments is illustrated in FIG. 2.

The exemplary preferred embodiments utilize an SR that includes one or a number of reserve bits, exemplified by the 'r' field. Reserved bits enable additional functionality or instruction set/instruction set behavior changes to be added at a future time. Preferably, CPU core 102 executes at least a first set of instructions, which is conducted in the general fetch, decode, execute format. Still preferably, CPU core 102 emulates a second set of instructions using the first set of instructions. In preferred embodiments, the S, Q and M bits preferably are used to support the emulation of the second set of instructions, and the FR, SZ and PR bits are used to provide additional support for emulation of floating-point instructions that are preferably included in the second set of instructions.

The IMASK field preferably contains four (or another number) bits to allow CPU core 102 to be set to one of 16 priority levels for masking interrupts. The FD bit preferably controls whether floating-point instructions preferably included in the first set of instructions are enabled (when clear) or disabled (when set). The ASID field preferably indicates the address space identifier of the "thread" of instructions currently being executed and is used by the memory management unit, as will be more described elsewhere herein. The WATCH bit preferably controls whether watchpoints are disabled (when clear) or enabled (when set). The STEP bit preferably controls whether single-stepping is disabled (when clear) or enabled (when set). The BL bit preferably controls whether exceptions, traps and interrupts are allowed (when clear) or blocked (when set). The MD bit preferably controls whether instructions are executed in user mode (when clear) or in privileged mode (when set), and data is read or written in user mode (when clear) or in privileged mode (when set). As will be understood, the MD bit implicitly affects instruction execution. The MMU bit preferably controls whether the MMU is disabled (when clear) or enabled (when set), also as will be more fully described elsewhere herein.

As previously discussed, in preferred embodiments CPU core 102 includes an MMU for managing memory transactions in the processor. Preferred embodiments include such an MMU, although the functionality of the MMU is scalable and may be configured most appropriately for the particular processor requirements. The present invention provides MMU capabilities that thus allow the memory management features supported by an implementation to be tailored to the particular processor requirements. In preferred embodiments, MMU features include the following:

disable/enable; a mechanism to allow the MMU to be disabled (such as for boot-strap purposes), and enabled (such as for program execution);

protection; a mechanism to associate protection information with address ranges to allow those address ranges to be protected against inappropriate access;

cache control; a mechanism to associate cache behavior information with address ranges to allow control of the cache for those address ranges;

effective address space; all memory accesses made by executing instructions on the CPU are to addresses in effective address space;

physical address space; all memory accesses made by the CPU to the memory system are to addresses in physical address space; and translation; in embodiments where translations are not supported (or turned off, etc.), effective addresses are turned into physical addresses by an identity mapping; preferably, when such address translations are provided, the mapping of effective addresses into physical addresses is programmable.

Also in preferred embodiments, the MMU allows the following parameters to be scaled/varied between different implementations:

number of implemented bits in effective addresses;
number of implemented bits in physical addresses;
page sizes; number of page sizes, and their actual sizes;
caching; number of supported cache behaviors;
translation; supported or not supported;
number of effective address spaces; and
organization and size of the translation description.

The MMU of CPU core 102 preferably may be enabled and disabled in a flexible and desired manner. For example, after power-on reset or manual reset, in preferred embodiments CPU core 102 starts executing with the MMU disabled. The enable/disable state of the MMU can be accessed through the SR control register. The MMU can be enabled or disabled using one or more instructions that alter the MMU bit of the SR, as previously described. Accordingly, various sequences for enabling and disabling the MMU may be desirably utilized in a convenient manner. As described elsewhere herein, preferred embodiments support mapping between effective addresses and physical addresses, although embodiments may not support such mapping.

CPU core 102 interacts with the physical memory system using physical addresses in a physical address space as illustrated in FIG. 3A. In preferred embodiments, there is a single physical address space. In preferred embodiments, the total physical address space contains $2^{64}$ bytes. Preferably, physical addresses are unsigned and therefore may vary in the range of $[0, 2^{64}]$. As will appreciated, particular embodiments may or may not necessarily implement all of the physical address space; the amount provided may be varied between implementations. The number of bits of the implemented physical addresses, nphys, preferably will be in the range of [32, 64]. These implemented bits preferably are the least significant bits of the physical address. In preferred embodiments, an implemented subset of the 64-bit total physical address space may have the upper (64-nphys) bits of the physical address set to the same value as bit number (nphys−1). In certain embodiments, the implemented physical address space may be sign-extended into the total physical address space. The implemented physical address space may consist of addresses in the range of $[0, 2^{nphys-1}]$ and the range of $[2^{64}-2^{nphys-1}, 2^{64}]$ as illustrated in FIG. 3A. In embodiments where nphys is 64, this collapses to a single range of $[0, 2^{64}]$.

Figure 3B:
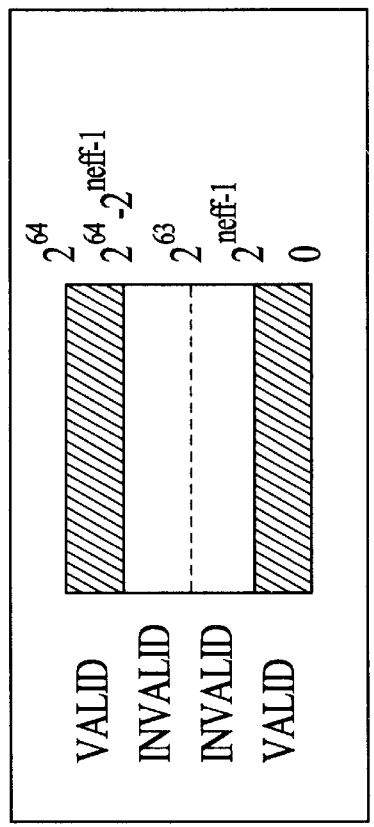

Also in preferred embodiments, memory accesses made by CPU core 102 are characterized by an effective address and a data width. The total effective address space preferably is 64 bits as illustrated in FIG. 3B, and preferably the effective address computation in load/store instructions is performed to 64-bit precision. The organization of the 64-bit effective address space may be analogous to that of the physical address space, and preferably contain $2^{64}$ bytes. With such embodiments, effective addresses are unsigned and may vary in the range of $[0, 2^{64}]$.

Particular embodiments of the present invention may or may not necessarily implement all of the effective address space; the amount provided may be varied between implementations. The number of bits in the implemented effective address is referred to as neff in FIG. 3B. If the implementation does not support translation, then neff may have the same value as nphys. If the implementation supports translation, then neff will be in the range [nphys, 64]. In such embodiments, the implemented effective address space is always sufficient to map all of the implemented physical address space. These implemented bits preferably are the least significant bits of the effective address. An implemented subset of the 64-bit total effective address space may have the upper (64-neff) bits of the effective address set to the same value as bit number (neff−1), as illustrated in FIG. 3B. In certain embodiments, the implemented effective address space may be sign-extended into the total effective address space, and the implemented effective address space may occupy effective addresses in the range of $[0, 2^{neff-1}]$ and the range of $[2^{64}-2^{neff-1}, 2^{64}]$. In embodiments where neff is 64, this collapses to a single range $[0, 2^{64}]$.

For implementations that support translation, the mappings from effective addresses to is physical addresses preferably are as outlined below. When the MMU is disabled, the mapping algorithm preferably is common to all implementations. When the MMU is enabled, the mapping algorithm will depend on whether the implementation supports translation. When the CPU makes an access to an effective address, the mapping preferably is achieved as follows:

1. The effective address is checked for validity. Validity checking increases compatibility between implementations with varying amounts of implemented effective address space. If neff is 64, then the effective address is always valid and an improper/erroneous address exception will not be raised. Otherwise, if the effective address is in the range $[2^{neff-1}, 2^{64}-2^{neff-1}]$, then the effective address will be detected as invalid and an address error exception will be raised. If the effective address is valid, the mapping continues.
2. If the MMU is disabled, the effective address is converted directly into a physical address without translation as described elsewhere herein.
3. If the MMU is enabled and the MMU does not support translation, the effective address preferably is converted directly into a physical address without translation. Such a mapping is described in greater detail elsewhere herein. It should be noted that, although there may not be an address translation, various properties may be associated with the access.
4. If the MMU is enabled and the MMU does support translation, the effective address preferably is converted into a physical address by a translation process. The translation mechanism preferably supports multiple effective address spaces. Each effective address space is typically associated with a different process. The effective address spaces are distinguished by an address space identifier ("ASID"), described in greater detail elsewhere herein.

In preferred embodiments, the granularity for associating attributes with address space is the page. Preferably, multiple page sizes can be supported, and any or all of the different page sizes can be in use at the same time. Page sizes are always a power-of-2, $2^n$, where n varies in the range of [12, nphys]. The smallest possible page size in certain preferred embodiments (for example) is 4 kbytes, and the largest possible page size exactly fills the physical address space. A page in memory should always starts at an address which is aligned to its page size.

Physical address space is partitioned into pages. Preferably, for a given page size, $2^n$, bits 0 to n−1 of the physical address represent the byte-index within the page, and bits n to nphys−1 represent the physical page number (PPN). Effective address space is also partitioned into pages. Translation information, if supported, is associated with each effective page. For a given page size, $2^n$, bits 0 to n−1 of the effective address represent the byte-index within the page, and bits n to neff−1 represent the effective page number (EPN). Each memory access made by the instruction stream preferably is fully contained within an 8-byte grain of memory aligned to an 8-byte boundary. This means that no accesses straddle a page boundary, and every access should be fully contained within a single page.

Figure 3C:
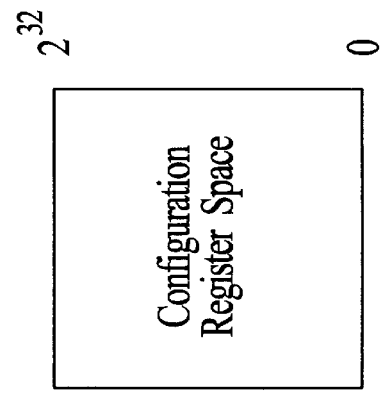

Of particular importance to particular embodiments of the present invention, the MMU and cache are accessed not through a memory space, but a separate configuration register space. In preferred embodiments, the configuration space contains $2^{32}$ 64-bit configuration registers or locations, as illustrated in FIG. 3C (again, the present invention is not particularly limited to any particular number or size of configuration registers, etc.). It should be noted that the configuration space is independent from the memory address space and is accessed differently. It is not translated and it is not accessible by general load and store instructions such as those that load general purpose registers from other general purpose registers or memory, etc. The registers/locations in configuration space preferably are not byte-addressed, but rather are addressed by configuration number. The notation CFG[i] may be used to refer to the $i^{th}$ 64-bit configuration register. In preferred embodiments, configuration registers are advantageously used to configure highly implementation-dependent parts of CPU core 102, such as the MMU and cache.

In preferred embodiments, configuration registers are accessed using two instructions. An instruction GETCFG (again, not a general purpose load/store instruction) performs a 64-bit data transfer from a configuration register to a general-purpose register. More specifically, the GETCFG instruction preferably moves the contents of a configuration register into a general register Rd. The source configuration register preferably is identified by adding the contents of another general register Rm to a (preferably) 6-bit signed immediate value. An instruction PUTCFG performs a 64-bit data transfer from a general-purpose register to a configuration register. More specifically, the PUTCFG instruction moves the contents of a general register Ry to a configuration register. The destination configuration register is identified by adding the contents of another general register Rm to the a (preferably) 6-bit signed immediate value.

For both the GETCFG and PUTCFG instructions, the configuration register preferably is identified by adding a base value (preferably provided in a register) with an offset value (preferably provided as an immediate value). In preferred embodiments, the GETCFG and PUTCFG are privileged instructions and are executed in privileged mode. An attempt to execute either of these two instructions in user mode preferably results in a reserved instruction exception. Reading an undefined configuration register preferably will result in an undefined value. Writing an undefined configuration register similarly may lead to undefined behavior. In alternative embodiments, other conditions may result, such as an exception being raised.

It should be noted that, in certain prior art processors, a special instruction may be used to access such TLB resources (such as Write TBL entry type of instruction). A PUTCFG-type of instruction in accordance with the present invention, in conjunction with the configuration register space, may enable a single instruction with the behavior of writing the configuration registers to be adopted; thus, even the TLB (and cache) resources may be scaled or changed in a second processor, a new instruction with a new behavior need not be defined; the original PUTCFG-type instruction behavior may also be used in the second processor, etc.

As discussed previously, MMU and cache resources are mapped into configuration space. The configuration registers for the MMU in preferred embodiments will now be further described.

FIGS. 4A and 4B illustrate exemplary MMU configuration registers utilized in preferred embodiments of the present invention. The 'r' field indicates reserved bits. The other fields of the MMU configuration registers, referred to herein as PTEH and PTEL, are summarized in FIG. 4C and discussed in greater detail elsewhere herein. In preferred embodiments, the PTEH and PTEL configuration registers are replicated to provide an array of page table entries that describes the available mappings from effective to physical addresses.

In preferred embodiments, each configuration register is 64 bits wide, with two such configuration registers used to implement one page table entry of the MMU/TLB. As will be noted, not all available registers and not all available fields are implemented on all variants of the preferred embodiments. As will be appreciated, among other advantages of the use of configuration registers in configuration space as described herein, a first processor may be developed with one MMU configuration (with appropriation selection of MMU configuration registers in configuration space), and with a first set of address bits available in the registers/locations in configuration space. More particularly, with the present invention, the MMU (and cache characteristics) are defined and controlled through the use of configuration registers, with the fields, sizes and number of configuration registers such that ASIDs (number of processes supported, etc.), effective page number, physical page number, protection, and size fields (i.e., preferably almost all aspect of the configurations registers, except, preferably, the SH and V fields) changeable from a first processor to a second process so the MMU (and cache) characteristics may be more readily scaled or varied between the first processor and the second processor. A second processor, perhaps a processor having at least some attributes similar to the first processor, may have an MMU that is scalable in that the size may be changed by implementing additional (or fewer) configuration registers, and the reserved bits may be used, for example, in the second processor to utilize larger address fields in the configuration registers. In other words, with such preferred embodiments, additional processors with scaled/variable MMU characteristics may be more readily developed by implementing the desired number of configuration registers (i.e., leading to a different number of page table entries in a TLB) and by using larger (or smaller) address fields in the MMU/TLB, etc. Thus, a series of microprocessors of differing, but perhaps related, characteristics, may be more readily developed and implemented, with the MMU properties readily scaled as desired for the various microprocessors of the series.

Further description regarding operation of CPU core 102 when the MMU is disabled will now be provided. After a power-on reset, a manual reset or a special type of exception, the MMU is automatically disabled, and CPU core 102 executes code with the MMU disabled. Execution of code with the MMU disabled in general provides more predictable behavior regardless of the state of the MMU configuration registers. This is important because MMU implementations can contain many programmable fields and these fields may have an undefined value after power-on reset. Additionally, after a manual reset or certain types of exception events, the previous values of these fields may not be valid. In preferred embodiments, the amount of code that executes with the MMU disabled in general is relatively small. Such code, often referred to as a boot-strap, needs to program the MMU with an appropriate memory management configuration and then enable the MMU. The details of the configuration depend upon the memory management features provided by the particular embodiments. In general, the speed of execution of code when the MMU is disabled is not critically important due to the fact that one of the actions of the boot-strap code will be to configure the MMU and enable it. This can be achieved with a relatively small number of instructions, and the execution model for code when the MMU is disabled may be relatively simple.

When code executes with the MMU disabled, effective addresses preferably are mapped directly to physical addresses. This mapping is essentially an identity translation. However, in the case where the implementation supports more effective address space than physical address space (i.e. neff>nphys), the physical address space appears replicated throughout the effective address space. The effective address (EA) preferably is mapped to a physical address (PA) by $PA \leftarrow SignExtend_{nphys}(EA)$. This mapping is exactly an identity translation when neff and nphys are identical. In general, there is no protection mechanism when the MMU is disabled. In addition, data accesses are implemented as though they were device accesses (as is known in the art, "device accesses" generally refer to accesses that are not buffered, and are accessed sequentially or otherwise-as specified in the particular instructions, without processing in manner to more efficiently manage the transactions specified by the instructions, etc.). The data cache effectively is frozen and bypassed (although, as explained elsewhere, data cache resources may be accessed in this state with certain instructions). The precise amount of data specified by the instruction is transferred, and there is no data prefetching.

When the MMU is disabled, instruction fetches are not cached. The instruction cache (for those embodiments that include a separate instruction cache) also effectively is frozen and bypassed. Additionally, the amount of instruction prefetching preferably is restricted to avoid prefetches from areas of physical memory such as those that are designated device areas. Preferably, CPU core 102 will not speculatively fetch instructions outside of the smallest page (provided in the particular embodiments) enclosing the program counter. Since accesses are not cached while the MMU is disabled, optimal performance in general will not be achieved. Accordingly, in most embodiments the MMU is configured and enabled as soon as possible after reset, etc.

When the MMU is enabled, the mappings from effective addresses to physical addresses are described using page table entries ("PTE"). Each page table entry consists of two configuration registers (PTEH and PTEL), as described earlier, that specify the properties of that page in effective and physical address space. Page table entries are held in an array to allow multiple pages to be described. A PTE array is also called a translation lookaside buffer (TLB). Preferred exemplary organizations of the PTE arrays, the contents of the PTE configuration registers, the mapping mechanisms and implementation options will now be described in greater detail.

In general there are two possible organizations of the page table entry arrays used in various embodiments of the present invention: unified and split. A unified organization basically consists of a single array of page table entries. Each entry controls the behavior of both data and instruction accesses to the described page. The number of entries in the array is implementation defined and is represented herein by u. The configuration registers in the unified array are called MMUR[n].PTEH and MMUR[n].PTEL, where n varies in the range of [0, u].

A split organization, on the other hand, generally consists of two arrays of page table entries. An entry in a first, data register array controls the behavior of data accesses to the described page, whereas an entry in a second, instruction register array controls the behavior of instruction accesses to the described page. The number of entries in these arrays is defined for the particular embodiment and is represented here by d for the data register array and i for the instruction register array. The configuration registers in the data array are called MMUDR[n].PTEH and MMUDR[n].PTEL, where n varies in the range of [0, d]. The configuration registers in the instruction array are called MMUIR[n].PTEH and MMUIR[n].PTEL, where n varies in the range [0, i].

While both unified and split organizations are expressly contemplated for use in various embodiments of the present invention, in certain preferred embodiments, for example, split arrays are used, and, for example, the data PTE array size is 64, and the instruction PTE array size is 64. Thus, in such embodiments both d and i have the value 64. All entries in the PTE array preferably are equivalent, and the PTE arrays are fully associative, and each entry may hold information for any effective to physical address mapping.

The fields within the PTE configuration registers are generally provided to control or influence particular functions or behaviors. Some fields may or may not be provided in all embodiments, and some may only be provided in embodiments that support translation, for example. Moreover, the behavior of some fields may depend on whether the PTE array organization is unified or split. With reference to FIGS. 5A through 5I, the fields in preferred PTE configuration registers will be described in greater detail (with the specific field definitions and the like being exemplary, etc.).

As illustrated in FIG. 5A, an enable field (preferably 1 bit) (PTEH.V) is provided to control whether this PTE is valid or invalid. This bit preferably allows software to invalidate unused PTEs, and to ensure that PTEs are invalid while they are programmed, for example.

As illustrated in FIG. 5B, a page size field (PTEL.SZ) is provided. The number of supported page sizes, npage, can vary between particular embodiments, though each embodiment and implementation must provide at least 1 page size. While 2 bits are illustrated in FIG. 5B, in general a different number of size bits (and sizes) also are within the scope of the present invention. The sizes of the supported pages in general are also embodiment/implementation defined. FIG. 5C illustrates exemplary supported page sizes used in particular preferred embodiments of the present invention As illustrated in FIG. 5D, a cache behavior field (PTEL.CB) is provided. As discussed elsewhere herein, embodiments of the present invention may optionally provide instruction and data caches. In accordance with such different embodiments, different cache behaviors may be desirably selected to allow the behavior of the cache to be specified for accesses to different pages. If caches are not supported in the particular embodiment, then the cache behavior field should be set to uncached. The different cache behaviors available in preferred embodiments are distinguished using the cache behavior field. In general, cache behavior is a property of the physical page, and it is important to ensure that all mappings that share the same physical page have the same cache behavior, otherwise the behavior of memory accesses to that page may be unpredictable.

The available instruction cache behaviors in preferred embodiments are cached instruction fetches and uncached instruction fetches. The available data cache behaviors in preferred embodiments are cached accesses with write-back behavior, cached accesses with write-through behavior, device accesses (these preferably are uncached and the exact amount of data is accessed, etc., such as is described elsewhere herein), and uncached accesses (these preferably are uncached but may access data more efficiently than permitted for device pages). FIG. 5D illustrates exemplary cache behaviors utilized in preferred embodiments of the present invention. If a RESERVED setting is listed, then the behavior is architecturally undefined, and may be assigned in a future, second processor, etc.

As illustrated in FIG. 5E, a protection field (PTEL.PR) is provided. In general, accesses are checked for various kinds of protection violation. Protection violation in preferred embodiments causes an appropriate exception to be raised. Protection generally is a property of the effective page. There is no requirement for mappings that share the same physical page to use the same protection attributes. In preferred embodiments, each PTE has a protection field containing the following bits: PTEL.PR.U (when set the page is accessible to user and privileged mode, otherwise it is accessible to just privileged mode); PTEL.PR.W (when set the page is writable, otherwise non-writable); PTEL.PR.R (when set the page is readable, otherwise non-readable); PTEL.PR.X (when set the page is executable, otherwise non-executable).

As will be understood, in preferred embodiments permission is granted to privileged mode for an access if the appropriate access permission is given. Permission is granted to user mode for an access if PTEL.PR.U is set and the appropriate access permission is given. Prohibited accesses result in the raising of an appropriate exception. The protection field is illustrated with exemplary behaviors in FIG. 5E. If a RESERVED setting is.listed, then the behavior is architecturally undefined, and may be assigned in a future, second processor, etc.

As illustrated in FIG. 5F, a physical page number field (PTEL.PPN) is provided. In preferred embodiments, for a page size of $2^n$ bytes there are (nphys–n) bits in the PPN. The PTEL.PPN field in general contains sufficient bits to contain the smallest page size allowed by the architecture (e.g., 4 kbytes). Thus, PTEL.PPN contains (nphys–12) bits. Where the actual page size is greater than this smallest page size, the PPN should be stored in the most significant bits of the PTEL.PPN field and the remaining least significant bits of PTEL.PPN must be cleared. For example, in preferred embodiments there are 20 bits in the PTEL.PPN field.

As illustrated in FIG. 5G a shared page field (PTEH.SH) is provided. This field preferably is provided only in embodiments/implementations that support translation. The shared page field (PTEH.SH) in general is used to control sharing of pages between different ASID values. It is used in the effective address look-up mechanism described elsewhere herein. Briefly, when SH=1, the page is shared regardless of the ASID values (e.g., the ASID preferably is ignored).

As illustrated in FIG. 5H, an address space identifier field (PTEH.ASID) is provided. This field preferably is provided only in embodiments/implementations that support translation. The PTEH.ASID field is used to distinguish different effective address spaces. In general, the number of provided effective address spaces may be varied between implementations. It is used in the effective address look-up mechanism described elsewhere herein.

As illustrated in FIG. 5I, an effective page number field (PTEH.EPN) is provided. This field preferably is provided only on implementations that support translation. For a page size of $2^n$ bytes there are (neff–n) bits in the EPN. The PTEH.EPN field should always contains sufficient bits to contain the smallest page size allowed by the architecture (e.g., 4 kbytes). Thus, PTEH.EPN contains (neff–12) bits. Where the actual page size is greater than this smallest page size, the EPN should be stored in the most significant bits of the PTEH.EPN field and the remaining least significant bits of PTEH.EPN should be cleared. In certain preferred embodiments, there are 20 bits in the PTEH.EPN field. The number of EPN bits required for each of an exemplary set of page sizes is illustrated in FIG. 5I.

In accordance with the present invention, effective address mapping may be provided with embodiments that do not support translation. In such embodiments, effective addresses preferably are mapped directly to physical addresses. This mapping preferably is an identity translation; the physical address is identical to the effective address. An identity mapping is sufficient since the range of valid effective addresses exactly matches the range of physical addresses; neff and nphys should be identical for an implementation that does not support translation. This physical address is then used to perform an associative look-up in the appropriate PTE array. A match is found if the physical page described by a PTE contains the physical address of the access. If a match is found, the look-up determines the protection and cache attributes to be used for that access. If a match is not found, then an exception is raised to indicate an instruction miss (ITLBMISS) or data miss (RTLBMISS or WTLBMISS). The content of the PTE arrays must be arranged such that there is, at most, one PTE that describes the mapping of any physical address.

Also in accordance with the present invention, effective address mapping may be provided with translation. As will be understood, translation generally provides more flexible control over the mappings from effective addresses into physical addresses. Standard virtual memory can be supported by using effective address space, the translation mechanism and appropriate software. In this case, the virtual memory map is determined by software not by the CPU architecture.

In preferred embodiments, this effective address mapping preferably is achieved as follows. The effective address of the access and the ASID of the current process are used to perform an associative look-up into the appropriate PTE array. The following checks are made against each PTE: (1) an effective address match is found if the EPN of the effective address of the access matches the PTEH.EPN field. It should be noted that the bits of the effective address preferably used in this comparison depend on the page size of that PTE. For a page of size $2^n$ bytes, bits n to neff−1 inclusive of the effective address are compared; and (2) an ASID match is found if PTEH.SH is 1, or if the ASID of the current process (SR.ASID; SR is discussed elsewhere herein) matches the PTEH.ASID field. The PTEH.SH field allows pages to be shared across all processes regardless of ASID.

Figure 6:
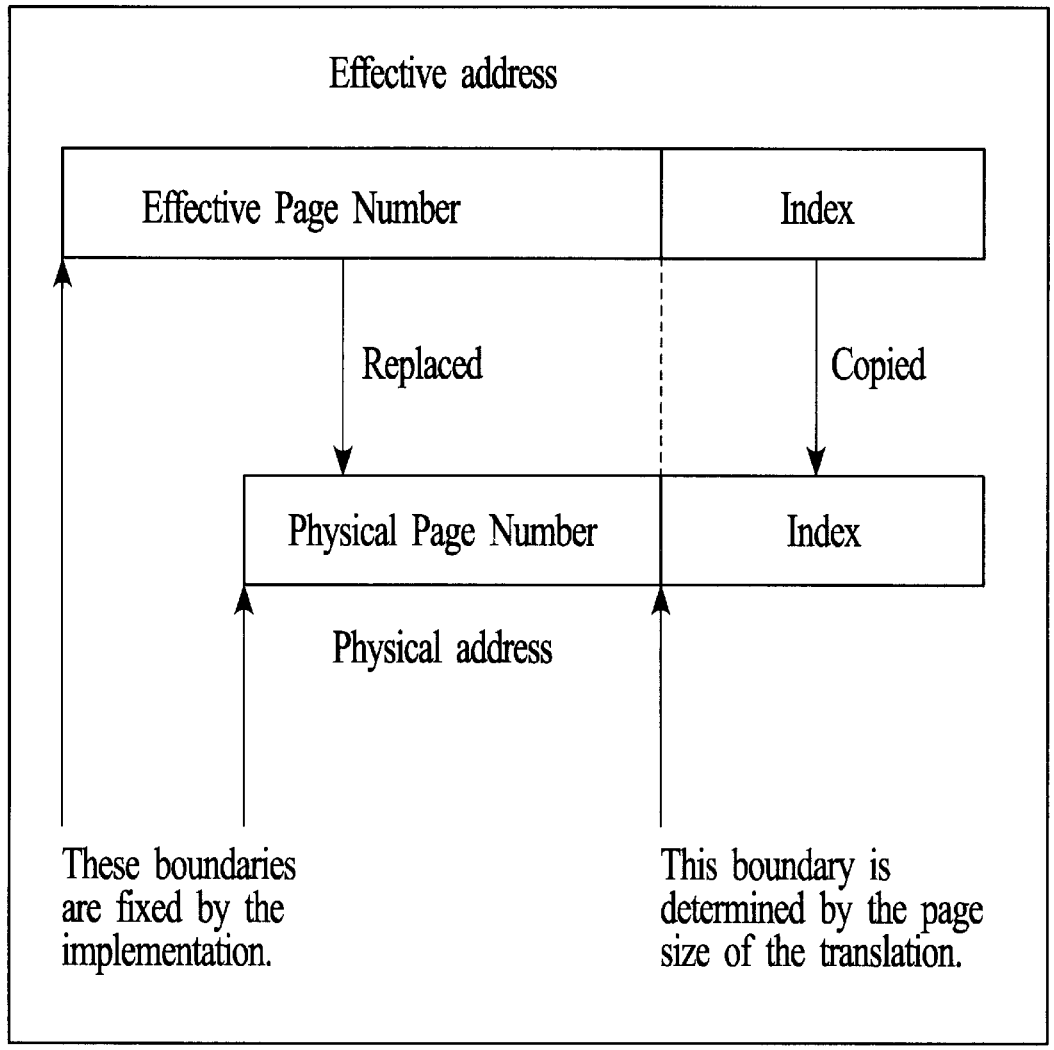
FIG. 6 illustrates an exemplary translation from an effective address to a physical address in accordance with preferred embodiments of the present invention.

A PTE match requires an effective address match and an ASID match in the same PTE. If a PTE match is found, the look-up determines the attributes (physical page number, protection and cache attributes, etc.) to be used for that access. The translation from effective address to physical address preferably is achieved by substituting the physical page number for the effective page number. Thus, the byte-index within the page may be retained, and the EPN may be replaced by the PPN. This process is illustrated in FIG. 6.

If a PTE match is not found, then an exception is raised to indicate an instruction miss (ITLBMISS) or data miss (RTLBMISS or WTLBMISS). Such an exception preferably may be used to cause software refill of the appropriate PTE array, and to detect accesses to invalid addresses. In preferred embodiments, PTE refill is performed completely in software; there is no hardware page-table walking. In preferred embodiments, there should be, at most, one PTE that describes the mapping of any effective address in any effective address space. If there are multiple mappings present for any effective address and ASID combination, then the behavior in general may be undefined. Appropriate software is utilized in certain embodiments to prevent this condition.

In accordance with the present invention, variations are available in the PTE array organization, and also the PTE state. If translation is not supported, then implemented PTE fields may be read-only. This variation may provide a set of hard-wired non-translated mappings, and may result in a very simple implementation. For example, the PTE look-up may be implemented by decoding bits from the effective address, rather than by an associative lookup into a PTE array. Such a variation in general supports systems with very simple memory management requirements. If translation is not supported, then implemented PTE fields may be read-write. This variation may provide programmable control of protection and caching at the page level, but without support for translation. Such a variation may be used to support systems that require protection without the cost of translation, for example. If translation is supported, then implemented PTE fields may be read-write. This variation may be fully featured and may be used to support standard virtual memory.

The interaction between the memory management unit and the caches (for embodiments that implement caches, etc.) in accordance with preferred embodiments will now be described.

When the MMU is disabled, in preferred embodiments the cache state is bypassed and frozen with respect to accesses. Effectively, the cache is disabled. This preferred behavior is provided regardless of whether the caches are themselves enabled or disabled. The cache enable flag preferably only has an effect when the MMU is enabled. Thus, in such embodiments, if the MMU is disabled but the caches are enabled, the cache state is still bypassed and frozen. It should be noted that bypassing means that accesses do not see the state of any caches; essentially, accesses always miss a bypassed cache. Freezing means that accesses do not modify the state of any cache. In effect, accesses proceed as if the cache were not present. It also should be noted that cache coherency instructions and the cache configuration mechanisms still operate on the cache state, and will access the cache as usual. This may be used to provide software with a means to access the cache state regardless of whether the MMU is enabled or disabled.

There are a number of advantages to such a preferred arrangement. First, the behavior of the cache when the MMU is disabled is fully specified, allowing the well-behaved execution of instructions without encountering paradoxical (or inconsistent or undefined, etc.) cache situations. In addition, after a manual reset, software may be used to observe the complete state of the cache prior to the reset. This may be advantageously utilized, for example, in "post-mortem" debugging or other code analysis or the like. Also, in normal operation the MMU is enabled; thus, it is possible to arrange for the MMU to be disabled, instructions to be executed without translation, and the MMU to be re-enabled without affecting the cache state. This behavior allows the system to support, for example, non-intrusive, fully-decoupled, interactive debugging. Essentially, a debugger may be used to arrange to run its own code, with the MMU disabled, without affecting the functional behavior of the target system.

When the MMU is enabled, the behavior of the caches may be programmed by software. The cache behavior is specified using PTEL.CB, as described elsewhere herein. In preferred embodiments, the PTEL.CB setting can be overridden by cache configuration in the following ways. First, if data caching is disabled, then the data cache behavior of each PTE may be treated as uncached regardless of the value of PTEL.CB. If instruction caching is disabled, then the instruction cache behavior of each PTE may be treated as uncached regardless of the value of PTEL.CB. If the data cache is configured with write-back disabled, then any PTE with a cachable PTEL.CB may be treated as write-through and not as write-back.

In preferred embodiments, the cache replacement algorithm is implementation specific and may support cache locking (cache locking is also described in greater detail elsewhere herein). In such embodiments, it may be possible to arrange the cache locking such that the cache is fully locked. In such embodiments, cachable accesses that miss the cache will behave as uncached accesses. When the MMU is enabled, in preferred embodiments software is responsible for guaranteeing that the caches are used in an appropriate manner. In particular, software should ensure, for example, that cache paradoxes are avoided. A cache paradox occurs when a memory access finds that the current cache state is inconsistent with the required cache behavior. An example is a device access which finds that the accessed data is in the cache; this situation is inconsistent with device access conditions/semantics. Preferably, software conventions are used to prevent such situations. For example, it is important to ensure that all mappings that share the same physical page have the same cache behavior, otherwise the behavior of memory accesses to that page may be unpredictable.

As described elsewhere herein, a problem with virtual caches is known as the cache synonym. For embodiments that support translation, an implementation may place additional constraints on the permitted values of PTEH.EPN and PTEL.PPN for cachable pages. Such constraints may serve to avoid and/or help resolve cache synonyms and allow more efficient MMU and cache implementations.

One exemplary constraint in certain embodiments is specified by a single parameter, nsynbits, which has an embodiment/implementation-specific value. Such a parameter may provide the number of least significant bits of PTEH.EPN and PTEL.PPN that can suffer from cache synonyms. Such bits are called synonym bits (they also are sometimes referred to as "coloring" bits). Note that the smallest page size supported by preferred embodiments is 4 kbytes, and thus both PTEH.EPN and PTEL.PPN will not include the least significant 12 bits of the address. This constraint requires that PTE values for cachable pages are programmed such that the synonym bits have identical values in all PTEH.EPN instances that map the same PTEL.PPN.

This constraint allows cache implementations to index into the cache using lower order bits from the effective address rather than the physical address. Thus, software preferably arranges the memory mappings of cachable pages such that bits [0, nsynbits] of all PTEH.EPN instances that map the same PTEL.PPN are identical. If a particular PTEL.PPN is only mapped once, then there is no constraint. If, however, there are 2 or more mappings of a particular PTEL.PPN, then software should arrange the PTEH.EPN values to satisfy this constraint. If software does not honor the constraint, then the behavior of the cache likely will be unpredictable. It should be noted that, if the selected page size is $2^{12+nsynbits}$ bytes or larger, then the constraint is automatically honored due to page alignment. As an example, the value of nsynbits for a particular preferred embodiment may be 1. Thus, cachable mappings using a preferred 4 kbyte page size are constrained by 1 synonym bit. With such embodiments, larger page sizes are not constrained.

In preferred embodiments, nsynbits will be in the range [0, nsynmax] for all implementations. With such embodiments, bits of PTEH.EPN and PTEL.PPN above nsynmax will not suffer from synonym problems. It is desirable and preferred that software honors such a stricter architecturally-defined nsynmax constraint, rather than the weaker implementation-defined nynbits constraint. Using this preferred constraint allows software to arrange its memory mappings in a way that will be compatible with future embodiments/implementations. As an example, the value of nsynmax may be 4. Thus, future implementations may require that cachable mappings using a 4 kbyte page are constrained by 4 synonym bits. Embodiments/implementations may be developed that do not constrain mappings that use 64 kbyte page size or larger.

For embodiments that have read-write PTE fields, software is able to change the contents of a PTE. The MMU of CPU core 102 preferably places a usage model on page table updates to allow a wide variety of implementations. This model preferably requires software to honor certain constraints when changing the contents of a page mapping. The MMU architecture preferably uses the model that the entries in the PTE arrays (the hard PTEs, or the page table entries in the on-chip TLB) are a subset of a larger set of notional PTE values maintained in some way by software (the soft PTEs, typically a collection of entries in an external page table, usually stored in main memory). Software may then be given complete freedom as to how the soft PTEs are managed. For example, they may be managed by a memory-held PTE data structure, they may be calculated on the fly, they may not physically exist, or other alternatives.

Preferably, the MMU is informed of the existence of a soft PTE at the point where that PTE is loaded into a hard PTE and enabled. While the MMU is informed of the existence of a soft PTE, the MMU can (optionally) cache the hard PTE into a cached PTE. The cached PTE may allow the MMU to retain the state of the soft PTE even when the corresponding hard PTE has been reprogrammed. This property preferably enables the use of virtual caches in preferred embodiments, for example.

Under normal use, software in general will evict entries from hard PTEs and refill from soft PTEs as required by page misses. These evictions and refills do not generally require the state of the soft PTEs to be changed, and no special operations generally are required to keep the cached PTE state coherent. When, however, a soft PTE is modified, then the cached PTE state must be made coherent by explicit software actions. Two conditions should be met (at the same time) to inform the MMU of this modification. First, there must be no enabled hard PTE corresponding to the soft PTE. This may be achieved by disabling the hard PTE, if any, which corresponds to that soft PTE. Second, there must be no valid or dirty lines in any cache corresponding to effective addresses mapped by that soft PTE. This condition is automatically satisfied if the cache behavior of the PTE is device or uncached. If it is cached, the condition must be satisfied through an appropriate cache coherency mechanism, such as described elsewhere herein.

The soft PTE preferably identifies an effective page in the effective address space defined by PTEH.EPN, PTEH.ASID and PTEL.SZ. The following scenarios illustrate modifications to the soft PTE.

1. The effective page is being demapped (i.e., such as by the page being returned to secondary storage and therefore becomes no longer accessible).
2. The effective page is being remapped (i.e., PTEH.EPN is being changed).
3. The cache behavior (PTEL.CB) of the effective page is being changed. It should be noted that cache behavior is a property of the physical page, and change to PTEL.CB should be synchronized across all mappings of that physical page.

4. The protection properties (PTEL.PR) of the effective page are being changed such that any of the protection attributes has an increase in protection (i.e., there are accesses to the old PTE which are no longer permitted to the new PTE). This occurs if any of the permission bits are changed from 1 to 0. If none of the protection bits are changed so as to increase their protection (i.e., each bit is either unchanged or is changed to allow more accesses), this does not count as a PTE modification in these circumstances. This concession allows software to catch first accesses to a page without incurring any PTE coherency cost. For example, software might mark a clean page as non-writable, catch the initial write exception and then enable write permission (such a procedure is described in greater detail elsewhere herein). Enabling write permission does not require PTE coherency.

5. The sharability (PTEL.SH) of the effective page is being changed.

Exemplary code sequences that may be applicable for the MMU of preferred embodiments of the present invention will now be described.

Such code sequences manipulate the MMU and preferably are executed in privileged mode. For embodiments that execute a first instruction set and then emulate a second instruction set using the first instruction set, such code sequences preferably use the first instruction set only. It also is preferred that interrupts should typically be prevented across these critical code sequences.

As one example, the MMU may be enabled or disabled by using a return from exception (RTE) instruction or similar instruction that can modify the MMU bit of the SR. Other exemplary instructions are GETCON and PUTCON-type instructions, which preferably are instructions that are preferably provided specifically to access control registers such as the SR. In exemplary embodiments, GETCON preferably provides a 64-bit data transfer from a control register (such as SR or other control registers in CPU core 102) to a general purpose register. PUTCON preferably performs a 64-bit data transfer from a general purpose register to a control register. Thus, by proper loading of a value in a general purpose register and a PUTCON instruction, the contents of a control register such as SR may be altered. Alternatively, by providing suitable values such as in a saved or second program counter PC or saved or second status registers (preferred embodiments utilize such "SPC" and "SSR" registers, which store a saved copy of the program counter and status register, respectively), or other suitable registers, then an RTE-type instruction (or other instruction) may switch the PC and the SR to new values. This desirably allows the MMU to be enabled or disabled at the same time as changing the PC, which may be accomplished with a single RTE-type instruction.

An RTE-type instruction used in preferred embodiments will now described in greater detail. In preferred embodiments, the RTE-type instruction allows an exception handler or other software to recover a previous program context (e.g., contents of program counter, status register, etc.). In preferred embodiments, this is often used as the final instruction of an exception handler. The RTE-type instruction of the preferred embodiment preferably performs the following actions. The program counter is restored from SPC (in preferred embodiments, the lowest bit of SPC determines the instruction set mode (for embodiments implementing multiple instruction sets, such as described elsewhere herein) of the next instruction to be executed. The remaining bits of SPC determine the program counter of the next instruction to be executed. In addition, the SR is restored from SSR. Execution of instructions continues from PC in the instruction set mode, with the instruction stream synchronized.

The following changes might happen upon execution of an RTE-type instruction in preferred embodiments. The MMU might be enabled or disabled. The privilege level MD might change. The ASID might change. The instruction set mode might change. Execution of an RTE-type instruction in preferred embodiments also ensures that the next instruction is fetched correctly with respect to such changes.

In preferred embodiments, instruction fetching is automatically synchronized across such an RTE instruction. The RTE instruction is fetched according to the original value of SR. Execution of the RTE instruction switches PC to SPC and SR to SSR. The immediately following instruction is at the new PC and is fetched according to the new SR. With such preferred embodiments, it is not necessary to use a separate synchronization-type instruction (such as SYNCI, discussed below), and there generally is no requirement to use an identity translation when changing the MMU enable/disable status.

Data accesses, however, in such embodiments may not be automatically synchronized across an RTE-type instruction. When the MMU is enabled or disabled, it is desired to use a synchronization instruction before the RTE-type instruction in order to synchronize data accesses. This ensures that all previous data accesses are completed, including flushing of any access buffering, before the MMU status is changed. Data synchronization is important because changing the MMU status can dramatically change the cache behavior, and it is necessary to ensure that this occurs at a well-defined point in time relative to memory accesses.

Before turning to some exemplary code sequences, such synchronization-type instructions that may be used in accordance with the present invention will now be described in greater detail.

In preferred embodiments, instructions are provided for certain synchronization operations. These synchronization type instructions preferably include the following: SYNCI is used to synchronize instruction fetch; SYNCO is used to synchronize data operations; and SWAP is used for software synchronization through the memory system. These preferred synchronization type instructions will now be described in greater detail.

A SYNCI instruction preferably is used to synchronize instruction fetch. In preferred embodiments, execution of a SYNCI instruction ensures that all previous instructions are completed before any subsequent instruction is fetched. In preferred embodiments, however, the SYNCI instruction does not ensure that the effects of those previous instructions on data memory have completed. In such embodiments, data synchronization may be achieved separately using a SYNCO instruction (described in greater detail elsewhere herein).

A SYNCI-type instruction, for example, may be used to synchronize instruction fetch after code has been loaded or modified, synchronize instruction fetch after instruction translations have been modified, and stop speculative execution of subsequent instructions. In some embodiments, mechanisms are provided to optimize instruction fetch. As one example, instruction prefetching and instruction buffering may be provided. Instruction prefetching is a technique to reduce instruction fetch latency where instructions are fetched before they are needed. Instruction buffering is a technique to reduce instruction fetch latency where instructions are held in a buffer close to the CPU, perhaps associated with target registers used in implementing branch operations, etc. In preferred embodiments, in response to a SYNCI-type instruction any such state will be invalidated to ensure that subsequent instructions are refetched. Also in preferred embodiments, the SYNCI instruction does not cohere the state of any instruction cache, and this must be achieved by explicit cache coherency instructions where required.

Also in preferred embodiments, a data synchronization instruction is provided. Such a "SYNCO" instruction preferably is used to synchronize data operations. Data operations include load, store, swap, prefetch, allocate and data cache coherency instructions. Such a SYNCO instruction preferably imposes an ordering on data operations that is visible to other memory users. In preferred embodiments, execution of a SYNCO ensures that all data operations from previous instructions are completed before any data access from subsequent instructions are started. Additionally, such a SYNCO instruction itself preferably does not complete until all data operations from previous instruction have completed. As an example, a sequence of a SYNCO-type instruction followed by a SYNCI-type instruction may be used to guarantee that all previous instructions, and all previous data operations, are completed before any subsequent instruction is fetched. As other examples, a SYNCO-type instruction may be used to order accesses to a memory location that is shared with another memory user, order accesses to a device memory location, order cache coherency instructions with respect to other instructions, flush any write buffering, and prevent memory accesses from being merged or deleted.

In some embodiments, mechanisms may be provided to optimize data access. Such mechanisms in such embodiments may include write buffering, which is a technique in which written data is held in a buffer before being flushed out to memory at some later point. Write buffers can enhance memory performance by deferring and gathering writes. In preferred embodiments, any buffered data will be flushed during or in response to the SYNCO instruction to ensure that the previous write operations propagate through to memory. It should be noted that the preferred SYNCO instruction does not cohere the state of any data cache; in preferred embodiments, this is achieved by explicit cache coherency instructions where required.

Another synchronization-type instruction is the "SWAP" instruction, which is an atomic (as described in greater detail herein, atomically performed operation are performed until completion, basically without interruption to avoid improper behavior) read-modify-write operation on a memory location. The preferred SWAP-type instruction writes a new value into a (preferably) 8-byte memory object and returns its previous contents. In preferred embodiment, the memory system guarantees that the read and write parts of the swap instruction are implemented atomically on the target memory location with respect to any other accesses to that location. The swap also preferably is performed in memory regardless of the cache behavior associated with the access. Such a SWAP-type instruction preferably may be used by software to synchronize multiple memory users through the memory system.

Referring again to the operation of the MMU in preferred embodiments of the present invention, illustrative code sequences will now be described. The illustrative code sequences to follow use the following conventions:

—SR denotes the SR control register;
—SSR denotes the SSR control register;
—SPC denotes the SPC control register;
—MMU_BIT is the bit number of the MMU field within SR; and
—R0, R1 and TR0 can be used as temporaries.

An exemplary code sequence for enabling the MMU using an arbitrary translation is given below. The target instruction is specified in a general register R4, and it must be within an appropriate executable mapping. The target instruction may be mapped by an arbitrary translation (i.e., not necessarily an identity translation). Instructions such as MOVI (move immediate, etc.), SHLLI (shift left immediate), OR (logical OR operation) and SYNCO (synchronize data accesses) have conventional functionality in this particular context, unless otherwise stated or described herein. Instructions having particular functionality of particular note in the context of the present invention generally are described elsewhere herein.

Pre-conditions
—the MMU is currently disabled;
—the PTE configuration is valid;
—a PTE gives the target instruction an appropriate executable mapping;
—the cache has been appropriately configured.

GETCON SR, R0; get current SR, must have an appropriate ASID value
    MOVI 1, R1
    SHLLI R1, MMU_BIT, R1
    OR R0, R1, R0
    PUTCON R0, SSR; set the target SR (with the MMU enabled)
    PUTCON R4, SPC ; set the target PC
    SYNCO ; synchronize data accesses
    RTE —Post-conditions:
—execution continues at the address indicated by R4;
—execution proceeds with the MMU enabled.

It should be noted that the MMU may be disabled using a similar sequence. In this case an ANDC (logical AND operation, etc.) instruction may be used, instead of the OR, so that the MMU bit of SR is cleared rather than set. Also, the target instruction is specified in general register R4, and it refers to instructions that are executed with the MMU disabled (and no translation).

In certain embodiments it is sometimes convenient to enable or disable the MMU within the confines of an identity translation. This gives a straightforward code sequence. This may be achieved by ensuring that an identity executable mapping (i.e., EPN matches PPN) is provided for the entire set of instructions in the code sequence. This requires an appropriate setup of the PTE configuration registers. An exemplary code sequence for enabling the MMU using an identity translation will now be provided.

Pre-conditions
—the MMU is currently disabled;
—the PTE configuration is valid;
—a PTE gives these instructions an identity executable mapping;
—the cache has been appropriately configured.

GETCON SR, R0; get current SR
    MOVI 1, R1
    SHLLI R1, MMU_BIT, R1
    OR R0, R1, R0
    PUTCON R0, SSR; set the target SR (with the MMU enabled)

PTB label-$, TR0; calculate target PC
GETTR TR0, R0
PUTCON R0, SPC ; set the target PC
SYNCO; synchronize data accesses
RTE
Label
—Post-conditions:
—execution continues at the address indicated by the label;
—execution proceeds with the MMU enabled.

It should be noted that the MMU may be disabled using a similar sequence. In this case an ANDC instruction may be used, instead of the OR, so that the MMU bit of SR is cleared rather than set.

In preferred embodiments, a PTE can be enabled and disabled using a simple sequence of PUTCFG instructions (described in greater detail elsewhere herein). When a PTE is enabled or disabled, software preferably should ensure that a synchronization or RTE-type instruction is executed before any access to that PTE. This ensures that translation look-up, exception detection and memory access are performed correctly with respect to the modified PTE state. An exemplary code sequence for enabling a PTE is provided below.
Pre-conditions
R0 contains configuration space index of the PTE;
R1 contains new PTEH value (PTEH.V is set);
R2 contains new PTEL value;
OFFSET_PTEH is offset of PTEH within the PTE;
OFFSET_PTEL is offset of PTEL within the PTE.
   PUTCFG R0, OFFSET_PTEH, R63; disable PTE before modifying translation
   PUTCFG R0, OFFSET_PTEL, R2; set new PTEL value
   PUTCFG R0, OFFSET_PTEH, R1; set new PTEH value, enables the PTE
Post-conditions
—Ensure SYNCI or RTE is executed before any access through the;
—enabled PTE. This ensures that the access is translated correctly.

In preferred embodiments, the value of a PTE field will not be modified while the PTE is enabled. The PTE preferably should be disabled before modifying its contents. The contents of a PTE, however, in preferred embodiments may be safely read at any time. A PTE can be disabled by the following exemplary code sequence.
Pre-conditions
—R0 contains configuration space index of the PTE;
—OFFSET_PTEH is offset of PTEH within the PTE.
   PUTCFG R0, OFFSET_PTEH, R63
Post-conditions
—Ensure SYNCI or RTE is executed before any access through the;
—disabled PTE. This ensures that the exception is handled correctly.

A further description will now be provided with respect to the various types of caches, which may include virtual caches, used in various preferred and other embodiments of the present invention.

As is known in the art, caches are used to maintain a copy of data or instructions close to the CPU, based on "spatial locality" or "temporal locality," etc. Caches tend to decrease the access latency to cached data and instructions, and decrease the amount of memory bandwidth used for those accesses. Preferably, a cache can delay, aggregate, eliminate and re-order memory accesses. These techniques can enable high load/store performance even where memory latency is high compared to the CPU cycle time.

It should be understood that cache attributes often are specific to the particular implementation/embodiment. The cache structures and methodologies described herein are believed to provide particularly advantageous utility, particularly when combined with other aspects of the present invention (such as MMU attributes, particular instructions, configuration space, etc.), but such particular structures and methodologies should not be construed as particularly limiting the scope of the various embodiments of the present invention. Thus, embodiments that provide no cache, and those that include various of the cache attributes described herein (as well as other caches), all may be within the scope of various aspects of the present invention.

Although caches can have a significant effect on performance, the presence of the cache in general is functionally transparent to most software. This is because caches generally do not effect the memory model when viewed from just an instruction stream. Software that manages the cache directly (such as an operating system, etc.), however, may operate in a manner dependent upon specific properties of the cache.

Some properties of the cache can be described by implementation-specific parameters. Software that manages the cache should be written in terms of these parameters and provide mechanisms to allow the parameters to be set appropriately for the target implementation. Ideally, these parameters should be configurable at load-time or run-time to allow binary-level compatibility between implementations with different cache organizations. In other embodiments, however, it may be necessary to bind this information statically into programs. In preferred embodiments of the present invention, two mechanisms are provided for cache management. Cache prefetch, allocate and coherency instructions are provided, which are available to user and privileged mode software. Use of these instructions generally insulate software from most implementation-specific cache properties. As also described elsewhere herein, cache configuration registers also are provided, which can be accessed using the configuration space from privileged mode using particular configuration instructions. As this is a highly implementation-specific mechanism, any software that uses this mechanism may require significant attention should it be ported to another implementation with a different cache organization. As a result, in preferred embodiments cache configuration registers are used sparingly by software, and the cache prefetch, allocate and coherency instructions are used instead where they can achieve the desired effect.

In preferred embodiments, only one level of cache is supported (although in other embodiments more than level of cache could be utilized). Various alternatives utilized in embodiments of the present invention include the following. No cache organization may be utilized, with both data and instruction accesses performed on memory without caching. A unified cache organization may be utilized, with both data and instruction accesses passing through a single unified cache. A split cache organization may be utilized, where data and instruction accesses are treated separately. Such a split cache organization may include the following alternative organizations. Only a data (or operand) cache may be implemented, with data accesses passing through the data cache, while instruction accesses are performed on memory without caching. Only an instruction cache may be implemented, with instruction accesses passing through the instruction cache, while data accesses are performed on memory without caching. A data cache and an instruction cache may be implemented, with data accesses passing through the operand cache, while instruction accesses pass independently through the instruction cache. In general, the choice of cache organization is independent of the PTE organization of the MMU. If a separate instruction cache is provided, then that cache does not need to support write accesses. It also should be noted that internal hardware or an external memory system may provide more levels of caches.

The unit of allocation in the cache is the cache block (often referred to as a cache line). A cache block is used to hold a copy of the state of some memory block. A cache block generally consists of data and address information. The data is used to hold a copy of the memory block. The address information is used to provide additional information specific to the memory block (if any) that is currently being cached. The precise information is implementation-specific, but generally it consists of the following parts. A flag to indicate whether that cache block is in use (valid) or not in use (invalid). A flag to indicate whether that cache block is clean or dirty. Information to identify the memory block in the address map. Cache access and replacement information for that cache block. The number of bytes of data associated with a cache block is called the cache block size. The cache block size generally is nbytes, where nbytes is a power-of-2. The value of nbytes is at least the register size of the architecture (e.g., 8 bytes) and at most the smallest page size of the architecture (e.g., 4 kilobytes). The actual value of nbytes is implementation-specific. If an implementation provides separate instruction and operand caches, then the cache block size generally will be the same for both caches. A memory block also contains nbytes bytes of contiguous memory. The physical and effective addresses of the memory block are exact multiples of nbytes (i.e., cache block size aligned).

Software that manages the cache directly often executes in a manner dependent upon the cache block size. In preferred embodiments, software treats the cache block size as an implementation-specific parameter and provide mechanisms to allow it to be set appropriately for the target implementation. In other embodiments, such as those where binary-level software compatibility is required across a set of implementations (i.e., a series of microprocessors as described elsewhere herein), the cache block size of those implementations in general will be the same. An instruction cache contains instruction cache blocks. A data cache contains data cache blocks. In a unified cache, each cache block is both an instruction and data cache block, and can be used for both instruction and data accesses.

A cache block is replicated to form a set. The value used to select a cache block from a set is called the way. The number of ways (also known as the set size and the associativity) is denoted nways, where nways is a power-of-2 and greater than 0. A set is replicated to form a cache. The value used to select a set from a cache is called the index. The number of sets is denoted nsets, where nsets is a power-of-2 and greater than 0. The associativity of the cache is the number of different cache blocks into which a particular memory block may be mapped. The amount of associativity is given by nways (the set size). The following arrangements are possible:

1. If nways=1, then this is a direct-mapped cache. A memory block can be mapped into exactly one cache block in the cache.
2. If nways>1 and nsets>1, then this is a nways-way set-associative cache. A memory block may be mapped into any of the nways cache blocks in a particular set in the cache.
3. If nways>1 and nsets=1, then this is a fully-associative cache. A memory block may be mapped into any of the cache blocks in the cache.

It should be noted that each of these arrangements corresponds to a particular selection of the nways and nsets parameters. This parameterization covers all three arrangements. The cache size in bytes is given by multiplying the cache block size by the set size by the number of sets. If an implementation provides separate instruction and operand caches, then the set size and number of sets may differ for each cache.

The way in which memory blocks are mapped to cache blocks is achieved as follows. The mapping is based on the address of the memory block. An address is split into an offset, an index and a tag. The boundaries between these fields are determined such as by implementation-specific properties described elsewhere herein. The fields generally are used as follows:

1. The offset selects a byte within the cache block. The number of bits in the offset field is $\log_2(\text{nbytes})$.
2. The index selects a set within the cache. The number of bits in the index field is $\log_2(\text{nsets})$.
3. The tag consists of all of the remaining address bits. The number of bits in the tag field is $64-\log_2(\text{nsets})-\log_2(\text{nbytes})$.

The mapping of an address proceeds by subscripting into the cache by the index to identify a set. This set consists of all of the cache blocks that this address may be mapped to. The implementation determines whether this mapping is based on the effective address or the physical address of the access. If there is no translation or if there is an identity translation, then this distinction is not important. Additionally, if the smallest page size of the implementation is such that the index of the address is unchanged by the translation process, then again the distinction is not important.

In the particular embodiment, it will be determined whether indexing occurs after translation (using the physical address) or before translation (using the effective address). In the latter case, it is necessary to ensure that all effective aliases (synonyms) of a particular address will index into the same set, otherwise the cache operation will be incorrect. The MMU architecture achieves this by placing constraints on allowed translations, as described elsewhere herein. If such constraints are not honored, then accesses to different effective aliases of a particular address may be mapped into different sets leading to multiple copies of some memory locations in the cache. In preferred embodiments, the cache provides no mechanisms to keep these cache synonyms coherent, and such undesired conditions may lead to an unpredictable and faulty memory model.

When an address is held in a particular cache block in a set, the tag is recorded in the cache block to identify this particular address. The index and offset fields need not be recorded as their value is inherent in the cache structure. The particular implementation determines whether the recorded tag is from the effective address or the physical address of the access. If the implementation does not implement all of the address space, then some of the upper tag bits will be redundant. If the tag is derived from the effective address and neff bits of effective address space are implemented, then (64-neff) bits of the tag are redundant. Similarly, if the tag is derived from the physical address and nphys bits of physical address space are implemented, then (64-nphys) bits of the tag are redundant.

After a power-on reset, in preferred embodiments the value of cache state and cache configuration registers are invalid. This is preferably performed by hardware, which ensures that the valid bits are set so that all entries are invalidated upon power-on reset (in other embodiments, the cache state and cache configuration registers may simply be undefined upon power-on reset). The MMU also is disabled, and this ensures that all cache state is bypassed and frozen with respect to instruction fetches and data accesses. The cache should be configured appropriately before the MMU is enabled. This preferably is preformed by invalidating the caches (if the hardware did not ensure such invalidation) and providing appropriate values to the (preferably four) cache configuration registers. Once the MMU is enabled, the cache becomes enabled as described in greater detail elsewhere herein. The cache behavior for accesses is then determined by the MMU and cache configurations. In preferred embodiments, there are various circumstances under which the MMU can be disabled. This may be due to an RTE-type instruction (described in greater detail elsewhere herein), a manual reset, a special type of exception known as a panic event, a debug exception or a debug interrupt. When the MMU is disabled, the cache returns to its frozen and bypassed state regardless of the cache configuration. In preferred embodiments, supported read and write accesses act on up to 8 bytes of data held in an 8-byte-aligned grain of memory. Since the cache block size preferably is at least 8 bytes, then each access will fall within a single cache block.

Preferably, embodiments that include operand/data caches support write-through and write-back behaviors. For write-through, each write access preferably updates any associated cache block and is then also propagated through to memory. A property of this approach is that write-through cache blocks are always a copy of the memory state, and can be discarded without requiring any further memory update. For write-back, write accesses can be performed on the cache block and the write to memory is postponed until that cache block is discarded. Write-back cache behavior preferably uses a bit in each cache block to distinguish clean and dirty data. Write-back allows aggregation of write accesses to a particular cache block. In preferred embodiments, write back with cache allocate is implemented, or write through without cache allocate.

The generic behavior of the cache for cacheable read and write accesses is as follows.

1. The address of the access is mapped to a set in the cache through the indexing procedure described elsewhere herein.
2. Each cache block in the selected/indexed set is checked to see if its tag matches the tag of the access. The cache look-up algorithm preferably operates so that there can be at most one match in the set.
3. There are two possible outcomes of the tag match. If there is no match, then this is a cache miss. In preferred embodiments, a replacement algorithm is used to select an appropriate cache block in the set for replacement. If, according to the algorithm, there is no replaceable cache block, then the access is performed on memory and there is no change to the cache state. If, according to the algorithm, there is a replaceable cache block, then that cache block is replaced. If that cache block is clean, then the entry in that block can be replaced without write back (i.e., the block entry can simply be reused); however, if that cache block is dirty, then its data must be written back out to memory before it is reused. The cache block preferably is then marked as clean and refilled from the memory address of this access, then the access continues as if the tag had matched. If there is a match, then this is a cache hit. Read accesses simply return the appropriate bytes from the cache block. Write accesses update the appropriate bytes in the cache block. For write-through behavior, a write updates both the cache block state and the memory state. For write-back behavior, a write updates just the cache block state and marks the cache block as dirty. In preferred embodiments, with a write miss in writeback mode, the TLB is accessed, the tags are updated and data is written in the cache, without waiting for a cache line/block fill (i.e., as opposed to completing the line/block fill first; hardware in the present invention preferably allows the specific data to be written in the cache, with the remainder of the line/block filled thereafter). The behavior for other accesses can differ from the above (e.g., swap accesses, prefetch accesses, allocate accesses and cache coherency instructions may result in other behaviors), and the present invention is not limited to the specific preferred behaviors set forth above.

The cache behavior of an instruction fetch, or data access is determined as follows. If the MMU is disabled, then the access bypasses the cache. If the MMU is enabled, then the cache behavior preferably is determined by the global cache behavior (specified in cache configuration registers; CCR, ICCR1, OCCR1, etc.) and by the page-level cache behavior (specified in the PTE for that access). These two behaviors preferably are combined by choosing the more restrictive behavior. As cache behavior in general is a property of a physical page in memory, software must ensure that all accesses to a particular physical page use compatible cache behaviors. For example, all data accesses to a physical page must use the same operand cache behavior, and all instruction fetches from a physical page must use the same instruction cache behavior.

In preferred embodiments, cache behavior can be selected independently for instruction accesses and data accesses, but preferably there are restrictions on the allowed combinations for a particular physical page. In such embodiments, uncachable instruction behavior can be used with either uncachable data behavior (device or uncached). Preferably, cacheable instruction behavior can be used with either cacheable data behavior (write-through or write-back). Such restrictions are desirable to ensure correct behavior on implementations with a unified cache. Additional discussion regarding cache behaviors in preferred embodiments will now be provided.

Accesses with uncached instruction behavior preferably are performed directly on the memory system. Uncached instructions in preferred embodiments are not placed in the cache, and therefore these accesses never hit the cache nor change the state of the cache. In particular implementations of the present invention, such accesses are used in an optimized manner. In such implementations, more data may be transferred than that specified in the access, and the access may be aggregated with other accesses.

Accesses with cached instruction behavior are performed through the cache. These accesses may hit the cache and may allocate clean cache blocks. In particular implementations of the present invention, such accesses also may be optimized. In such implementations, more data may be transferred than that specified in the access, and the access may be aggregated with other accesses.

Accesses with device data behavior are performed directly on the memory system. Device data preferably is not placed in the cache, and therefore these accesses never hit the cache nor change the state of the cache. In preferred implementations of the present invention device accesses are not optimized. In such implementations, the precise amount of data specified in the access is transferred and the access is not aggregated with any other. It should be noted that, preferably, it is desired that a synchronization instruction, such as the SYNCO instruction described elsewhere herein, be utilized.

Accesses with uncached data behavior are performed directly on the memory system. Uncached data preferably is not placed in the cache, and therefore these accesses never hit the cache nor change the state of the cache. In preferred implementations of the present invention uncached data accesses also may be optimized. In such implementations more data may be transferred than that specified in the access, and the access may be aggregated with other accesses.

Accesses with write-through data behavior are performed through the cache using writethrough semantics. These accesses preferably may hit the cache and may allocate a clean cache block in the case of read (but not writes) (preferably, the cache operating in write-through in the present invention does not allocate on writes). Dirty data is never placed in the cache, and therefore these accesses never hit on dirty data. In preferred implementations of the present invention such accesses may be optimized. In such implementations more data may be transferred than that specified in the access, and the access may be aggregated with other accesses.

Accesses with write-back data behavior are performed through the cache using write-back semantics. These accesses preferably may hit the cache and may allocate clean or dirty cache blocks. In preferred implementations of the present invention such accesses may be optimized. In such implementations more data may be transferred than that specified in the access, and the access may be aggregated with other accesses.

When a cacheable access misses the cache, a cache replacement algorithm is used to determine which, if any, cache block is to be removed from the cache to allow the new access to be cached. The address of the access is used to index into the cache (as described in greater detail elsewhere herein) and select a set. There will be nways cache blocks in the selected set, and these are candidates for replacement. The details of the cache replacement algorithm may be selected for the particular embodiment. Preferred embodiments use algorithms that maintain some additional state for each set to allow the choice to be influenced by the recent access history to that set. An algorithm used in certain preferred embodiments is to select the cache block which has been least-recently-used. In certain embodiments, a cache locking feature may be provided. The cache locking feature allows data to be loaded into cache blocks and then locked. Locked cache blocks are not eligible for replacement and will therefore remain in the cache until explicitly discarded. In certain embodiments, it is possible to lock all cache blocks in a particular set (e.g., fill locked ways using PREFI or PREFO-type instructions, described elsewhere herein). In such embodiments, the replacement algorithm will find no replaceable blocks, and any cache miss for that set will be performed on memory without caching. Other aspects of cache locking may be optimized for particular embodiments.

In preferred embodiments, swap accesses are performed in memory and not in the cache. This provides safe synchronization in the memory system regardless of the cache behavior. The actions performed by a preferred swap instruction for the various cache behaviors include the following. For device or uncached behavior, the effective address will not be cached. The swap is performed atomically (i.e., performed until completion without interruption, without peripheral devices taking control of the bus before completion, etc.) in memory. For write-through behavior, the effective address may be cached, but it will not be dirty. If it is cached, the cache block will be invalidated. The swap is performed atomically in memory. For write-back behavior, the effective address may be cached and may be dirty. If it is cached, the cache block will be purged (written-back if dirty, then invalidated). The swap is performed atomically in memory. In each case, after the execution of the swap instruction the targeted memory location will not be cached.

In preferred embodiments, when the MMU is enabled, inappropriate use of cache behavior can result in an access finding the cache in an inconsistent state. These states are referred to as cache paradoxes. Cache behavior is determined by page-level cache behavior and global cache behavior, and inappropriate management of page-level or global cache behavior can lead to cache paradoxes. In preferred embodiments, software (e.g., operating system) manages memory (while enabling one or more various application programs to run) while avoiding the following situations: an instruction access using 'UNCACHED INSTRUCTION' behavior hits the cache; a data access using 'DEVICE' behavior hits the cache; a data access using 'UNCACHED DATA' behavior hits the cache; a data access using 'WRITE-THROUGH DATA' behavior hits the cache and the cache block is dirty. In preferred embodiments the behavior of these accesses is architecturally undefined, and preferably software explicitly "coheres" the cache to avoid these situations when the cache behavior of a particular physical page is changed. When the MMU is disabled, the state of the cache is bypassed and frozen, and cache paradoxes cannot occur. A possible scenario is for software to be running with the MMU enabled, to then disable the MMU for some reason, and to subsequently re-enable the MMU. If software requires a coherent memory model through this sequence, then coherency must be achieved in software through appropriate cache management.

To summarize the significant interactions between the cache and MMU in preferred embodiments: normal cache operation is only provided when the MMU is enabled; constraints are placed on MMU configuration to assist resolution of cache synonym problems; and changing page table entries typically requires appropriate software management of the cache.

In preferred embodiments, there are three categories of cache instructions that are provided to control and manage cache operations: prefetch; allocate; and coherency. Such instructions allow software to control and optimize cache operation in a largely implementation-independent manner. It should be noted that such instruction may operate dependent upon the cache block size and this value may be selected for the specific embodiment.

In preferred embodiments, most of the cache instructions have no functional effect on the semantics of the memory model when viewed just from the instruction stream. Certain instructions, however, ALLOCO and OCBI (to be described in greater detail hereinafter) may have observable effects on the memory model. Such instructions may modify the value of memory locations, and the number of modified locations is determined by the cache block size. Special care should be exercised when using these instructions if portability to implementations with a difference cache block size is desired.

The preferred embodiment preferably provides two instructions for software-directed prefetching from a specified effective address. A PREFI-type instruction preferably is used to prefetch cache blocks with instructions, and a PREFO-type instruction preferably is used to prefetch cache blocks with data. When used in this way, software can consider these instructions as performance hints; they affect timing but not semantics. PREFI behaves much like an instruction fetch, except that it is software-directed. PREFO behaves much like a read access, except that data is loaded into a cache block rather than a register. In most respects, prefetches preferably behave like normal accesses.

With such prefetch instructions, cache operation, including cache behavior and cache locking, preferably is performed just like a normal access. Such instructions are susceptible to cache paradoxes just like a normal access. In preferred embodiments, there are a number of scenarios where a prefetch instruction preferably has no effect. A prefetch when the MMU is disabled has no effect. A prefetch with device or uncached behavior has no effect. If an embodiment does not provide an instruction cache or a unified cache, then a PREFI instruction would have no effect. If an embodiment does not provide an operand cache or a unified cache, then a PREFO instruction would have no effect. Prefetches preferably do not raise address error, translation miss or protection exceptions. If there is an address error, or a translation is not available, or a protection check fails, then the prefetch preferably has no effect. Such properties allow software to "speculate" prefetches (i.e., anticipate that an instrument may be needed and carryout a prefetch, etc.). If an embodiment provides cache locking, then prefetch instructions may be used to preload information into locked parts of the cache.

The preferred PREFI instruction will now be further described. PREFI indicates a software-directed instruction prefetch from a specified effective address. Software can use this instruction to give advance notice that particular instructions will be required. The effective address is calculated preferably by adding the contents of a general purpose register ($R_m$) to a (preferably) 6-bit sign-extended displacement value (such a value, as will be understood, can be coded as part of the fields of the binary encoding of the instruction, etc.). The effective address identifies a surrounding block of memory, which starts at an address aligned to the cache block size and has a size equal to the cache block size (which may be selected for a particular embodiment). Preferred embodiments will perform a prefetch of the memory block into the cache if allowed by the current cache behavior. No exceptions are raised while executing this instruction.

The preferred PREFO instruction will now be further described. PREFO indicates a software-directed data prefetch from a specified effective address. Software can use this instruction to give advance notice that particular data will be required. The effective address is calculated preferably by adding the contents of a general purpose register ($R_m$) to a (preferably) 6-bit sign-extended displacement value. The effective address identifies a surrounding block of memory, which starts at an address aligned to the cache block size and has a size equal to the cache block size (which may be selected for a particular embodiment). Preferred embodiments will perform a prefetch of the memory block into the cache if allowed by the current cache behavior. No exceptions are raised while executing this instruction.

Preferred embodiments also provide one or more allocate-type instructions. A preferred ALLOCO instruction allocates an operand cache block for a specified effective address (which preferably acts like a prefetch but without cache line fill; the tag areas of the array are updated, etc.), the preferred implementation of which will now be further described. The effective address identifies a surrounding block of memory, which starts at an address aligned to the cache block size and has a size equal to the cache block size. The allocate instruction provides a hint that the allocated operand cache block need not be fetched from memory. The value of each location in the memory block targeted by an ALLOCO is set to zero in the preferred embodiment (in other embodiments it may simply be undefined, and in still other embodiments changed from its previous state, but not explicitly defined). The preferred ALLOCO instruction will not reveal any data which would break the protection model. In user mode, the ALLOCO instruction could leave the memory block unchanged, or with some pattern defined for the particular embodiment, or with some data that is accessible to the particular software thread that is being executed. In privileged mode, the ALLOCO instruction could leave the memory block with any value, since privileged threads can arrange visibility of any memory state.

ALLOCO is preferably designed to be used in combination with write-back cache behavior, and preferably ALLOCO is used to allocate an operand cache line which is then completely over-written with new data using store instructions, and subsequently written-back. ALLOCO can eliminate an unnecessary cache block fetch from memory, avoiding read memory latency and reducing memory bandwidth. The allocate instruction is checked for address error, translation miss and protection exceptions just like a data write to that address. In preferred embodiments, there is no misalignment check; the provided effective address is automatically aligned downwards to the nearest exact multiple of the cache block size. The treatment of cache behavior, cache paradoxes and cache locking for ALLOCO preferably is the same as for a normal access.

In some situations an allocate instruction preferably has no effect (apart from the detection of exception cases). For example, an allocate when the MMU is disabled has no effect. An allocate with device or uncached behavior has no effect. If an implementation provides neither an operand cache nor a unified cache, then allocate has no effect.

The preferred ALLOCO instruction will now be further described. ALLOCO preferably is used to request allocation of an operand cache block for a specified effective address. The effective address preferably is calculated by adding the contents of a general purpose register ($R_m$) to a (preferably) 6-bit sign-extended displacement value. The effective address identifies a surrounding block of memory, which starts at an address aligned to the cache block size and has a size equal to the cache block size (which may be selected for a particular embodiment). The value of each location in the memory block targeted by an ALLOCO is set to zero in preferred embodiments. Programs preferably do not rely on these values. ALLOCO preferably checks for address error, translation miss and protection exception cases.

Preferred embodiments also provide a set of cache coherency instructions that allow the operand cache to be managed by software. Preferably, these instructions are include: ICBI, to invalidate an instruction cache block; OCBI, to invalidate an operand cache block; OCBP, to purge an operand cache block; and OCBWB, to write-back an operand cache block. For an invalidation, the cache block preferably is discarded without any write-back to memory. For a purge, the cache block preferably is written back to memory if dirty, and then discarded. For a write-back (or, as is it sometimes known, a "flush"), the cache block preferably is written back memory if dirty, but not discarded.

OCBI, OCBP and OCBWB perform cache coherency on physical memory. These instructions use an effective address to identify locations in physical memory which are to be cohered. The achieved coherency preferably applies to all aliases of that physical memory in the effective address space. In preferred embodiments, however, ICBI is only guaranteed to achieve coherency on effective memory. This instruction uses an effective address to identify locations in effective memory which are to be cohered. The achieved coherency preferably applies only to the effective address and effective address space seen by the ICBI. In other embodiments, stronger coherency than this (e.g., by implementing this as coherency on physical memory) may be provided, but in general software must not rely on this behavior where portability of the software to different implementations is required.

Such instructions preferably are checked for address error, translation miss and protection exceptions like memory accesses. ICBI preferably is checked just like an instruction fetch from that address. Exception cases in ICBI are raised in preferred embodiments although in alternative embodiments, if an exception case arises, the instruction executes to completion without exception launch but does not affect the state of the instruction cache (such behavior may desirably allows the cost of hardware to implement such an ICBI instruction to be reduced in some embodiments, with some complexity in debugging and the like).

OCBI preferably is checked just like a data write to that address. It is considered as a write because its execution can cause memory values to change (as viewed from the instruction stream). OCBP and OCBWB preferably are checked for readability or writability to that address. Thus, protection exception will be raised if both reads and writes are prohibited. The exception type is considered as a read exception because the execution of these instructions does not cause memory values to change (as viewed from the instruction stream). There is no misalignment check on these instructions; the provided effective address is automatically aligned downwards to the nearest exact multiple of the cache block size.

The preferred form of these instructions operate directly on the state of the cache. In many important respects, these instructions preferably behave quite differently to normal memory accesses. For example, these instructions update the state of the cache even if the MMU is disabled. In addition, these instructions update the state of the cache regardless of the programmed cache behavior. Also, these instructions update the state of the cache regardless of cache locking. These instructions are not susceptible to cache paradoxes. As will be apparent, however, such instruction functionality may be desirably utilized to manage the cache operation in accordance with the present invention.

These instructions preferably have a simple well-defined model of usage. Software can use these instructions to have a guaranteed effect on the cache regardless of the cache and MMU configuration. If a particular embodiment does not provide an instruction cache or a unified cache, then ICBI is checked for exceptions but otherwise behaves as a no operation. If a particular embodiment does not provide an operand cache or a unified cache, then OCBI, OCBP and OCBWB are checked for exceptions but otherwise behave as no operations. In a unified cache embodiment, ICBI and OCBI have the same effect on the cache, though it should be noted that their exception checks are different. Software preferably ensures that ICBI is used for instruction invalidation, and OCBI for data invalidation. This enhances software portability to other embodiments with split caches.

The preferred ICBI instruction will now be further described. ICBI preferably invalidates an instruction cache block (if any) that corresponds to a specified effective address. If a unified cache organization is used and the data in the instruction cache block is dirty, it preferably is discarded without write-back to memory. The effective address is calculated by adding the contents of a general purpose register ($R_m$) to a (preferably) 6-bit sign-extended displacement value. The effective address identifies a surrounding block of memory, which starts at an address aligned to the cache block size and has a size equal to the cache block size (which may be selected for a particular embodiment). ICBI checks for address error, translation miss and protection exception cases. Immediately after execution of ICBI, assuming no exception cases were detected, it is guaranteed that the targeted memory block in effective address space is not present in any instruction or unified cache. It should be noted that ICBI performs invalidation on effective memory. There is no guarantee of invalidation of aliases at other effective addresses or in other effective address spaces.

The preferred OCBI instruction will now be further described. OCBI preferably invalidates an operand cache block (if any) that corresponds to a specified effective address. If the data in the operand cache block is dirty, it is discarded without write-back to memory. The effective address is calculated by adding the contents of a general purpose register ($R_m$) to a (preferably) 6-bit sign-extended displacement. The effective address identifies a surrounding block of memory, which starts at an address aligned to the cache block size and has a size equal to the cache block size (which may be selected for a particular embodiment). OCBI checks for address error, translation miss and protection exception cases. Immediately after execution of OCBI, assuming no exception was raised, it is guaranteed that the targeted memory block in physical address space is not present in any operand or unified cache.

The preferred OCBP instruction will now be further described. OCBP preferably purges an operand cache block (if any) that corresponds to a specified effective address. If the data in As the operand cache block is dirty, it is written back to memory before being discarded. The effective address is calculated by adding the contents of a general purpose register ($R_m$) to a (preferably) 6-bit sign-extended displacement value. The effective address identifies a surrounding block of memory, which starts at an address aligned to the cache block size and has a size equal to the cache block size (which may be selected for a particular embodiment). OCBP checks for address error, translation miss and protection exception cases. Immediately after execution of OCBP, assuming no exception was raised, it is guaranteed that the targeted memory block in physical address space is not present in any operand or unified cache.

The preferred OCBWB instruction will now be further described. OCBWB preferably write-backs an operand cache block (if any) that corresponds to a specified effective address. If the data in the operand cache block is dirty, it is written back to memory but is not discarded. The effective address is calculated by adding the contents of a general purpose register ($R_m$) to a (preferably) 6-bit sign-extended displacement value. The effective address identifies a surrounding block of memory, which starts at an address aligned to the cache block size and has a size equal to the cache block size (which may be selected for a particular embodiment). OCBWB checks for address error, translation miss and protection exception cases. Immediately after execution of OCBWB, assuming no exception was raised, it is guaranteed that the targeted memory block in physical address space will not be dirty in any operand or unified cache.

As described earlier, certain preferred embodiments implement a virtually indexed, virtually tagged arrangement for the cache(s), or "virtual cache." Additional details regarding such virtual cache preferred embodiments will now be described. It should be noted that other embodiments do not necessarily use a virtual cache or the particular virtual cache feature herein described; such a virtual cache is believed, however, to provide significant advantages and benefits in such preferred embodiments.

Preferred embodiments preferably utilize a split cache organization; there are separate caches for operand data and for instructions. Both caches preferably are indexed using an effective address, and tagged by an effective address 1 (virtual cache). Such a preferred arrangement may be utilized with, and be supported by, the MMU and cache architectures described elsewhere herein. The use of such a virtual cache preferably allows most cache hits to be implemented in the cache without needing to consult the PTE arrays. This gives performance and power advantages relative to an implementation based on physical addresses. The virtual cache of the present invention keeps much of the PTE information in cache blocks as more fully described elsewhere herein.

When a cache implementation uses effective addresses to tag cache blocks, the issue of cache synonyms must be considered, as described elsewhere. The preferred MMU architecture allows a particular physical address to be mapped into multiple effective addresses and in multiple effective address spaces. The issue is whether these aliases can result in multiple simultaneous cache blocks to be valid for a particular physical address; i.e. whether the cache can contain synonyms. If synonyms are allowed, then coherency of those synonyms has to be considered.

In preferred embodiments, synonyms are guaranteed not to exist for operand cache blocks. Preferred embodiments provide transparent mechanisms discussed herein to resolve operand cache synonyms such that there is guaranteed to be at most one operand cache block corresponding to any physical address. Also in certain preferred embodiments, synonyms may exist for instruction cache blocks, and such embodiments are not required to provide mechanisms to resolve instruction cache synonyms. There may exist multiple instruction operand blocks corresponding to a particular physical address. It is preferably guaranteed in such embodiments that any synonyms of a particular physical address will occur in the same set. See also, the discussion elsewhere herein regarding software constraints and proper use of the MMU, etc.

Thus, preferred embodiments resolve synonyms in the operand cache, but does not resolve synonyms in its instruction cache. Since the instruction cache is 4-way associative, there may be up to four synonyms of a particular physical address in the instruction cache. There is an asymmetry between the policies for synonym resolution. This is because the instruction cache does not support writes, and multiple copies of instructions do not lead to incoherency in the instruction cache. In such preferred embodiments, however, this property is visible to software through the ICBI instruction. Software preferably takes special care when invalidating instructions (to ensure that, for example, synonyms are also invalidated, etc.). Other aspects of the cache and MMU architecture (described elsewhere herein) have been designed work with effectively-addressed and effectively-tagged caches. Preferably, software ensures cache coherency when the contents of page table entries are changed, as described elsewhere herein. Also as described elsewhere herein, the internal state of the caches in preferred embodiments, including the effective tags, is visible through configuration registers. This provides a flexible and expedient way for the cache to be managed and controlled, etc.

In preferred embodiments, both caches are 4-way associative. Also in such preferred embodiments, the replacement algorithm uses 6 bits of state per set to implement a least-recently-used policy (LRU). The LRU state orders the valid blocks in that set in an order determined by their last usage. This state is equivalent to an ordered list, with the head element representing the least-recently-used valid block and the tail element representing the most-recently used valid block. Invalid blocks preferably do not appear on this list.

Additionally, preferred embodiments provide a cache locking mechanism. Cache locking allows software to arrange for specified memory blocks to be locked into the cache. The granularity of locking in preferred embodiments is the way. Each way in the cache may be independently locked or unlocked. Once a way is locked, that way is not a candidate for replacement, and thus normal cache operation will not evict a cache block in a locked way. For each cacheable access, the replacement policy preferably behaves as follows.

1. If the access hits the cache, then this cache block is marked as the most-recently-used by moving it to the tail of the order list.
2. Otherwise, if the access misses the cache and the set contains blocks that are both invalid and unlocked, then one of those blocks is selected. If there are multiple such blocks, then one of these blocks is chosen (the actual choice is not important, in preferred embodiments). The selected block is marked as the most-recently-used by moving it to the tail of the order list.
3. Otherwise, if the access misses the cache and the set contains blocks that are both valid and unlocked, then one of those blocks is selected. Preferably a block is chosen that is least-recently-used; this is the one nearest the head of the order list. The selected block is marked as the most-recently-used by moving it to the end of the order list.
4. Otherwise, the access has missed the cache and all blocks are locked (they may be valid or invalid). In this case, there are no candidates for replacement and the access is implemented on memory with no caching.

For replacement purposes, in preferred embodiments all cache instructions count as accesses and cause the least-recently-used information to be updated as required by the above algorithm. Preferred embodiments utilize a 6-bit field (called LRU) to record the status of the replacement policy. There is an LRU field associated with each cache set. It should be noted it is possible to over-ride the above replacement policy to allow a prefetch into a specified way. This feature is provided to allow locked ways to be populated using prefetch instructions, and is described elsewhere herein.

Cache locking in preferred embodiments is configured through cache configuration registers, and therefore is preferably managed only in privileged mode. The preferred cache locking configuration affects all software execution threads, both user and privileged, regardless of address space identifier. A typical usage of cache locking is to partition the cache state between cache operation and RAM operation. One or more cache ways would be locked and loaded with a set of memory locations. Those memory locations will behave as low-latency RAM, while any unlocked cache ways will continue to behave as cache. The effect of the cache locking mechanism is to influence the cache replacement algorithm. Other cache properties and behaviors preferably are unaffected by the use of cache locking. When a cache block is locked into the cache, the data and address information for that cache block in preferred embodiments can still be modified by reads, writes, cache instructions and the normal operation of the cache. The only property that cache locking provides is to prevent a locked cache block from being chosen for replacement.

Once a way is locked, that way is not a candidate for replacement, and thus normal cache operation will not evict a cache block in a locked way. This rule preferably is applied regardless of whether the cache block is valid or invalid. Thus, an invalid cache block in a locked way is not a candidate for replacement. It is possible to lock any or all ways in the cache. If some ways are unlocked, normal cache operation continues in all those unlocked ways. If all ways are locked, then cache misses cannot cause cache blocks to be allocated in the cache and are achieved directly on memory without any caching.

Cache coherency instructions preferably operate directly on cache blocks regardless of whether those cache blocks are locked. The protection mechanisms provided by the MMU can be used, where required, to protect locked cache blocks against inappropriate access. Note that if a software execution thread has executability for an instruction cache block, then the thread can invalidate that block (regardless of locking). Similarly, if a thread has writability for an operand cache block, the thread can invalidate that block (regardless of locking). The cache provides a mechanism to over-ride the normal replacement algorithm so that memory blocks can be loaded into a specified way using prefetch instructions, as described in greater detail elsewhere herein. Preferred embodiments utilize cache configuration registers, also as described in greater detail elsewhere herein. Such preferred embodiments support separate instruction and operand caches, and the cache configuration registers also preferably are split in the same way. Each cache is associated with the following registers:

Cache configuration registers to control global cache behavior and cache locking (ICCR and OCCR);
  An array of configuration registers containing cache tag information (ICACHETAG and OCACHETAG); and
  An array of configuration registers containing cache data information (ICACHEDATA and OCACHEDATA).

Configuration registers ICCR and OCCR can be read using a GETCFG instruction and written using a PUTCFG instruction. Such registers preferably are used to enable caching, global cache invalidation, write-through/write-back selection (operand cache only) and management of cache locking. A PUTCFG to ICCR preferably must be followed by a synchronization instruction (SYNCI), while a PUTCFG to OCCR must be followed by another synchronization instruction (SYNCO). While intended to limitative of the scope of the present invention, in preferred embodiments such instructions ensure synchronization of instruction fetch and data access while cache properties are being modified.

Tag and data configuration registers preferably can be read using a GETCFG instruction. This allows a privileged mode thread to view the internal state of the cache. This may desirably be used in combination with cache coherency instructions to cohere specific cache blocks. It also may desirably be used with a debugger to give visibility of cache state while debugging. It should be noted that the cache state is highly volatile and some care is required to achieve predictable results. The cache state can be observed in a stable state in the following situations. When the MMU is disabled, both the instruction cache and operand cache are frozen. The state of these caches will be non-volatile when observed through GETCFG.

When the MMU is enabled, considerable care is needed to observe a stable cache state. In particular, the cache locking mechanism should be used to prevent the cache replacement strategy from changing cache state. The ICACHETAG and ICACHEDATA configuration registers, corresponding to locked instruction cache ways, will be non-volatile when observed through GETCFG. For the operand cache, it is also necessary to avoid making any load or store accesses that hit the operand cache since these can result in changes to OCACHETAG and OCACHEDATA. In order to observe a stable operand cache state, software should be written to avoid using load and stores in these GETCFG sequences; this may require appropriate synchronization instruction (SYNCO) barriers. In this case, the OCACHETAG and OCACHEDATA configuration registers, corresponding to locked operand cache ways, will be non-volatile when observed through GETCFG.

It also should be noted that these configuration registers should not be written to. The behavior of a PUTCFG to any of these registers may lead to undefined behavior. In particular, the memory model might be compromised and the behavior of memory accesses may be unpredictable.

In preferred embodiments, there are two instruction cache control registers, ICCR0 and ICCR1. As for ICCR0, it should be noted that software should exercise care when writing to this register. If instruction caching is changed from enabled to disabled, the instruction cache should simultaneously be invalidated to prevent cache paradoxes.

For illustrative purposes, FIGS. 7A and 7B provide summary descriptions of exemplary embodiments of the fields of ICCR0 and ICCR1 configuration registers used in preferred embodiments. Other embodiments may utilize different arrangements for such configuration registers, and the specific implements illustrated are not intended to be limitative of the present invention.

In preferred embodiments, the ICACHETAG configuration registers are organized as a 2-dimensional array. This array preferably is subscripted by way number and index number to give the tag information for a particular block in the instruction cache. The tag information for each instruction cache block is held in one configuration register. ICACHETAG0 preferably holds the effective address tag. This register also preferably contains a valid bit. This will be clear to indicate an invalid block, or set to indicate a valid block. When a block is invalid, all other fields have undefined values. It should be noted that, in preferred embodiments, a write to an ICACHETAG configuration register may lead to undefined behavior.

For illustrative purposes, FIG. 7C provides a summary description of an exemplary embodiment of the fields of ICACHETAG configuration registers used in preferred embodiments. Other embodiments may utilize different arrangements for such configuration registers, and the specific implements illustrated are not intended to be limitative of the present invention.

In preferred embodiments, the ICACHEDATA configuration registers are organized as a 3-dimensional array. This array preferably is subscripted by way number, index number and register number to give the data information for a particular block in the instruction cache. The information in ICACHEDATA preferably is only defined when the corresponding ICACHETAG is valid. In one particular preferred embodiment, for example, each instruction cache block contains 32 bytes of data. These 32 bytes are distributed over four 64-bit configuration registers. These registers are numbered r, where r is in [0,3]. Assume that the physical address cached by this block is represented by P, where P is a multiple of the cache block size. Assume that the physical memory is represented by a byte-array called PMEM. The lower 32 bits of register r contains cached data corresponding to PMEM[P+8r FOR 4]. The upper 32 bits of register r contains cached data corresponding to PMEM[P+8r+4 FOR 4].

The endianness of the data in each ICACHEDATA register preferably is consistent with two 32-bit memory accesses. The data preferably is always correctly formatted for interpretation as two instructions (e.g., of a first instruction set of 32 bits each, "Mode A instructions"). In little-endian mode, it will also be correctly formatted for interpretation as four instructions (e.g., of a second instruction set of 16 bits each, "Mode B instructions"). In big-endian mode, however, the first and second MODE B instructions will appear swapped in the register, and the third and fourth Mode B instructions will also appear swapped around. This swapping may be undone in software. It should be noted that a write to an ICACHEDATA configuration register may lead to undefined behavior.

For illustrative purposes, FIG. 7D provides a summary description of an exemplary embodiment of the fields of ICACHEDATA configuration registers used in preferred embodiments. Other embodiments may utilize different arrangements for such configuration registers, and the specific implements illustrated are not intended to be limitative of the present invention.

In preferred embodiments, there are 2 operand cache control registers, OCCR0 and OCCR1. As for the OCCR0 register, software should exercise care when writing to this register. If the operand cache is invalidated, then the state of any dirty cache blocks will be lost. Changing the value of either the OCCR0.OCE or OCCR0.OWT fields may result in a change in cache behavior. It should be noted that it may be necessary to flush, purge or invalidate the operand cache to avoid cache paradoxes.

For illustrative purposes, FIGS. 7E and 7F provide summary descriptions of exemplary embodiments of the fields of OCCR0 and OCCR1 configuration registers used in preferred embodiments. Other embodiments may utilize different arrangements for such configuration registers, and the specific implements illustrated are not intended to be limitative of the present invention.

In preferred embodiments, the OCACHETAG configuration registers are organized as a 2-dimensional array. This array preferably is subscripted by way number and index number to give the tag information for a particular block in the operand cache. The tag information for each operand cache block is held in 2 configuration registers: OCACHETAG0 holds the effective address tag; and OCACHTAG1 holds the physical address tag. Each register preferably contains a valid bit. These will either both be clear to indicate an invalid block, or both be set to indicate a valid block. When a block is invalid, all other fields have undefined values. It should be noted that a write to an OCACHETAG configuration register may lead to undefined behavior.

For illustrative purposes, FIGS. 7G and 7H provide summary descriptions of exemplary embodiments of the fields of the OCACHETAG0 and OCACHETAG1 configuration registers used in preferred embodiments. Other embodiments may utilize different arrangements for such configuration registers, and the specific implements illustrated are not intended to be limitative of the present invention.

In preferred embodiments, the OCACHEDATA configuration registers are organized as a 3-dimensional array. This array preferably is subscripted by way number, index number and register number to give the data information for a particular block in the operand cache. The information in OCACHEDATA preferably is only defined when the corresponding OCACHETAG is valid.

In preferred embodiments, each operand cache block contains 32 bytes of data. These 32 bytes are distributed over four 64-bit configuration registers. These registers are numbered r where r is in [0,3]. Assume that the physical address cached by this block is represented by P, where P is a multiple of the cache block size. Assume that the physical memory is represented by a byte-array called PMEM. Register r contains cached data corresponding to PMEM[P+8r FOR 8]. The endianness of the data in each OCACHEDATA register is consistent with a 64-bit memory access. A GETCFG instruction performs a 64-bit read and will therefore return a value which is consistent with memory endianness. It should be noted that a write to an OCACHEDATA configuration register may lead to undefined behavior.

For illustrative purposes, FIG. 7I provides a summary description of an exemplary embodiment of the fields of OCACHEDATA configuration registers used in preferred embodiments. Other embodiments may utilize different arrangements for such configuration registers, and the specific implements illustrated are not intended to be limitative of the present invention.

Also for illustrative purposes, FIGS. 8A and 8B provide an overview perspective of the virtual cache (as preferably implemented through configuration registers as described herein) of the preferred embodiment. The separate V valid fields of the ptag array and the vtag array should be noted. When, for example, implementing ptag checks such as for cache coherency (such as responding to externally provided cache coherency/snoop command, as described elsewhere herein), such a replicated validity field offers improvements in implementing hardware for such functionality. It also is noted that, in FIG. 8B, an exemplary LRU array is illustrated that is used in preferred embodiments for implementing cache replacement policy, as described elsewhere herein.

As will be appreciated by those of skill in the art, particularly in view of the disclosure herein, other well-known elements are also shown in FIGS. 8A and 8B, including the following: address lines 150 providing address information to clocked latches 151, which are used to select entries into PTAG array 155 (via decoder 155A), VTAG array 156 (via decoder 156A), data array 158 (via decoder 158A) and LRU array 159 (via decoder 159A); MUX 154 receiving data from the four ways of data array 158; way select signal selecting a way via MUX 154; aligner 153 under control of a control signal from latch 151 (aligners are known in the art to provide data alignment for different sizes of data and the like; and output latch 152. As will be appreciated by those of skill in the art, the various arrays shown in FIGS. 8A and 8B each receive address information via lines 150, the commonality of which is illustrated by the dashed lines connecting the arrays in FIGS. 8A and 8B.

Exemplary code sequences and algorithms such as for managing a cache in accordance with the present invention will now be described.

As previously described, the cache should be initialized before the MMU is enabled. In preferred embodiments, the necessary steps are as follows.

1. Write to OCCR0 to specify the global behavior of the operand cache, and to invalidate the state of the operand cache before it is used.

2. Write to OCCR1 to configure the operand cache locking information.
3. Write to ICCR0 to specify the global behavior of the instruction cache, and to invalidate the state of the instruction cache before it is used.
4. Write to ICCR1 to configure the instruction cache locking information. If cache locking is to be used, it should be noted that the caches cannot be pre-loaded until the MMU is enabled since this is necessary for pre-fetches to modify cache state. Cache locking sequences are described in greater detail elsewhere herein.

In preferred embodiments, there are 4 basic coherency operations.

1. Invalidation of operand cache blocks. This preferably is achieved using OCBI or OCCR0.OCE. It should be noted that invalidation of operand cache blocks will result in dirty operand cache blocks being discarded. Preferably, this is done with care since it can result in loss of memory state.
2. Write-back of operand cache blocks. This preferably is achieved using OCBWB.
3. Purge of operand cache blocks. This preferably is achieved using OCBP.
4. Invalidation of instruction cache blocks. This preferably is achieved using ICBI or ICCR0.ICE.

Such cache coherency operations preferably may be performed at three different granularities. The first is memory location: the appropriate instruction should be applied to the memory location. This will cohere a cache block sized memory block surrounding the supplied effective address. This preferably may be achieved in user or privileged mode.

The second is page of memory: for a small page of memory (such as the 4 kilobyte page in certain preferred embodiments), the appropriate cache coherency instruction should be iterated through the page with the effective address incrementing through the page in cache block size intervals. This preferably may be achieved in user or privileged mode. For larger memory pages, it is more efficient to use privileged mode and to scan through the cache state as viewed though the cache configuration registers. Each cache block that contains address information corresponding to the target page should be cohered using the appropriate cache coherency instruction. The target effective address can be calculated from the address information in the cache block.

The third is all cache: this preferably may be achieved in privileged mode only. Invalidation of the whole operand cache can be achieved using OCCR0.OCE, and of the whole instruction cache using ICCR0.ICE. For write-back or purge operations, a scan is necessary through the cache state as viewed through the cache configuration registers. Each valid cache block should be cohered using the appropriate cache coherency instruction. The target effective address can be calculated from the address information in the cache block.

When instruction cache invalidation is achieved through ICBI, in preferred embodiments invalidation is only guaranteed for cache blocks corresponding to the effective address used for the invalidation. This is because of the cache synonym issue described elsewhere herein. In some cases, however, instruction invalidation may be required at the physical level, to ensure that the instruction is invalidated in all effective address spaces that may map to the physical address of the instruction. The recommended approach is to use privileged mode and to inspect the instruction cache state through the cache configuration registers. The instruction cache state should be indexed using the cache index field of the effective address being invalidated. This identifies a set in the cache; all cache synonyms of the instruction will be in this set providing that the constraints to address cache synonym problems (described elsewhere herein) are followed. Each of these cache blocks should be investigated in the cache configuration registers, and invalidated using an appropriately targeted ICBI if required. It should be noted that it may be quicker to invalidate each case unconditionally, rather than performing a software check to see if that invalidation is really necessary. If it is necessary to invalidate many physical instructions, it may be easier or quicker to simply invalidate the entire instruction cache using ICCR0.ICE.

The following exemplary preferred sequence may be used to lock a single cache block in a particular way.

1. The following pre-conditions preferably will be hold. First, privileged mode must be used since configuration register access is needed. Second, the MMU must be enabled; SR.MMU should be set. Third, caching must be enabled. OCCR0.OCE should be set if locking into the operand cache; ICCR0.ICE should be set if locking into the instruction cache. Fourth, the target effective address should be mapped by a translation that is cacheable and contains appropriate permission. Read permission is required for prefetching into the data cache, and execute permission for the instruction cache.
2. The target way should be locked. The appropriate bit of CCR1.OW_LOCK or ICCR1.IW_LOCK should be set. The way should be locked before following steps to ensure that other accesses do not interfere with this sequence.
3. The target effective address should not already be in the cache. If this is not the case, it can be removed from the cache using OCBP, OCBI or ICBI as appropriate. Since instruction fetching is performed independently of program execution, instruction invalidation should always be achieved explicitly using ICBI. This must be done after locking the way in step 2.
4. The cache should be configured so that prefetches are performed into the target way. For operand cache locking, OCCR1.OW_LE should be set and OCCR1.OW_LOAD should be set to indicate the target way. For instruction cache locking, ICCR1.IW_LE should be set and ICCR1.IW_LOAD should be set to indicate the target way.
5. The cache block should be loaded using a prefetch instruction. Execute PREFO or PREFI, as appropriate, on the target effective address. The previous steps have arranged that this prefetch will miss the cache and cause the cache block in the specified way to be refilled from memory. In should be noted that if there is no translation or if the prefetch has no permission, then the prefetch will be ignored. Software preferably arranges for appropriate translation as described in step 1.
6. The load enable bit, OCCR1.OW_LE or ICCR1.IW_LE, can now be cleared to restart normal cache replacement.

A locked cache block can be removed from the cache through an appropriate purge or invalidation instruction. If the way is subsequently unlocked, then that way becomes a candidate for cache replacement.

As discussed elsewhere herein, certain preferred embodiments implement a virtual cache. In addition to provided improved methods for addressing the synonym problem in such virtual caches, such preferred embodiments also provide improvements in how read/write permissions are checked and processed with such virtual cache embodiments.

Figure 9:
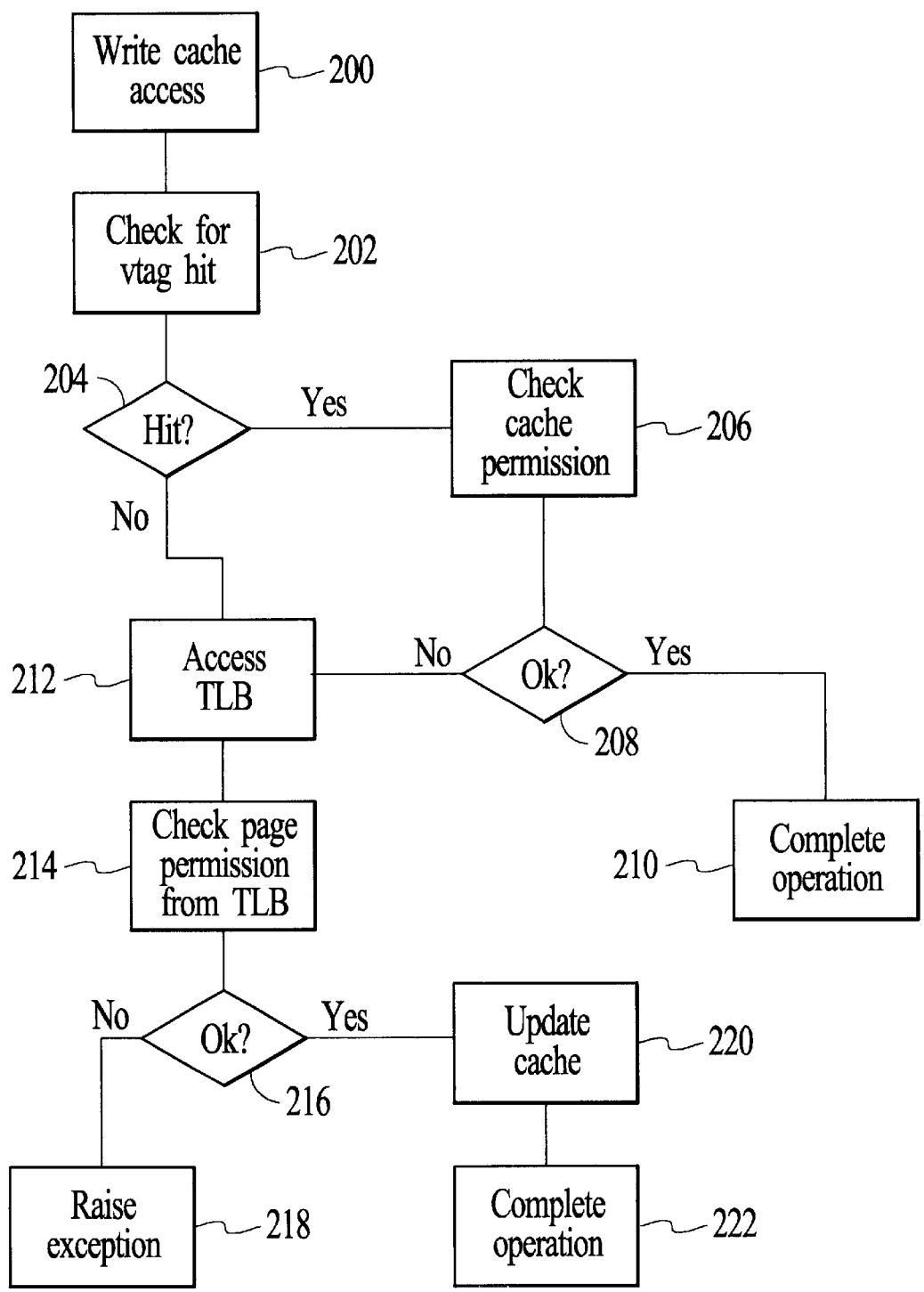
FIG. 9 is a flow diagram illustrating one exemplary process flow for widening permission in a virtual cache in accordance with preferred embodiments of the present invention.

Referring to FIG. 9, an exemplary flow chart for explaining a first example of such improved permission processing will be explained. At step 200, the cache is accessed, which for purposes of this example is a write request/operation. At step 202, a check/comparison is made between the virtual address for the write request (or a portion thereof) and the vtag of the virtual cache. After the comparison, a determination is made as to whether there was a vtag hit (step 204). If there was not a vtag hit, the next step is an access of the TLB (step 212). If the determination at step 204 was a vtag hit, then at steps 206 and 208 a check is made of the permission of the selected cache entry. If the selected cache entry has the proper permission (e.g., a permission field/bit setting authorizing write operations, etc.), then the operation is completed, which is represented by step 210. In general, in the case of the write operation, data is written into the selected cache entry, which may be a write through or write back operation (such as described elsewhere herein). If the selected cache entry does not have the proper permission (e.g., a permission field/bit limiting access to read operations, etc.), then the process proceeds to the TLB access of step 212.

At step 212, the TLB is accessed, using the virtual address for the write request (or a portion thereof) as the TLB input. Thereafter, a PTE is attempted to be selected by the virtual address, and the permission of the selected page is checked at step 214 (it should be noted that, in preferred embodiments, steps 212 and 214 may be performed together in a single step or cycle, etc.). As indicated by step 216, a determination of whether the proper permission is associated with the selected page is made after the TLB access. If the selected PTE does not have the proper permission for the write operation, then at step 218 an exception is raised, and exception handler software routine will then respond to the write request. If there was no PTE corresponding to the virtual address of the write request, then an exception also is raised at 218 (for processing by an appropriate exception handler, such as one for handling TLB misses). As an illustrative example, if the operating system or other software desires to detect the first write operation to a particular page, then the page may designated as read only initially, then the exception handler after step 218 could then update the TLB entry permission for that page to be read/write, for example.

If at step 216 a determination was made that the page did have the proper permission, then at step 220 the cache is updated. If the TLB was accessed at step 212 because of a NO determination at step 208, then only the permission field/bit of the cache needs to be updated at step 220. If the TLB was accessed at step 212 because of a NO determination at step 204, then the cache vtag, ptag, data and permissions are updated at step 220 (e.g., handled as a cache miss). At step 222, the operation is completed by, in the case of the write operation, data is written into the selected cache entry, which may be a write through or write back operation (such as described elsewhere herein). In this case, as a cache entry may be replaced, a process to determine which entry to replace (such as is described elsewhere herein) will be performed.

Figure 10:
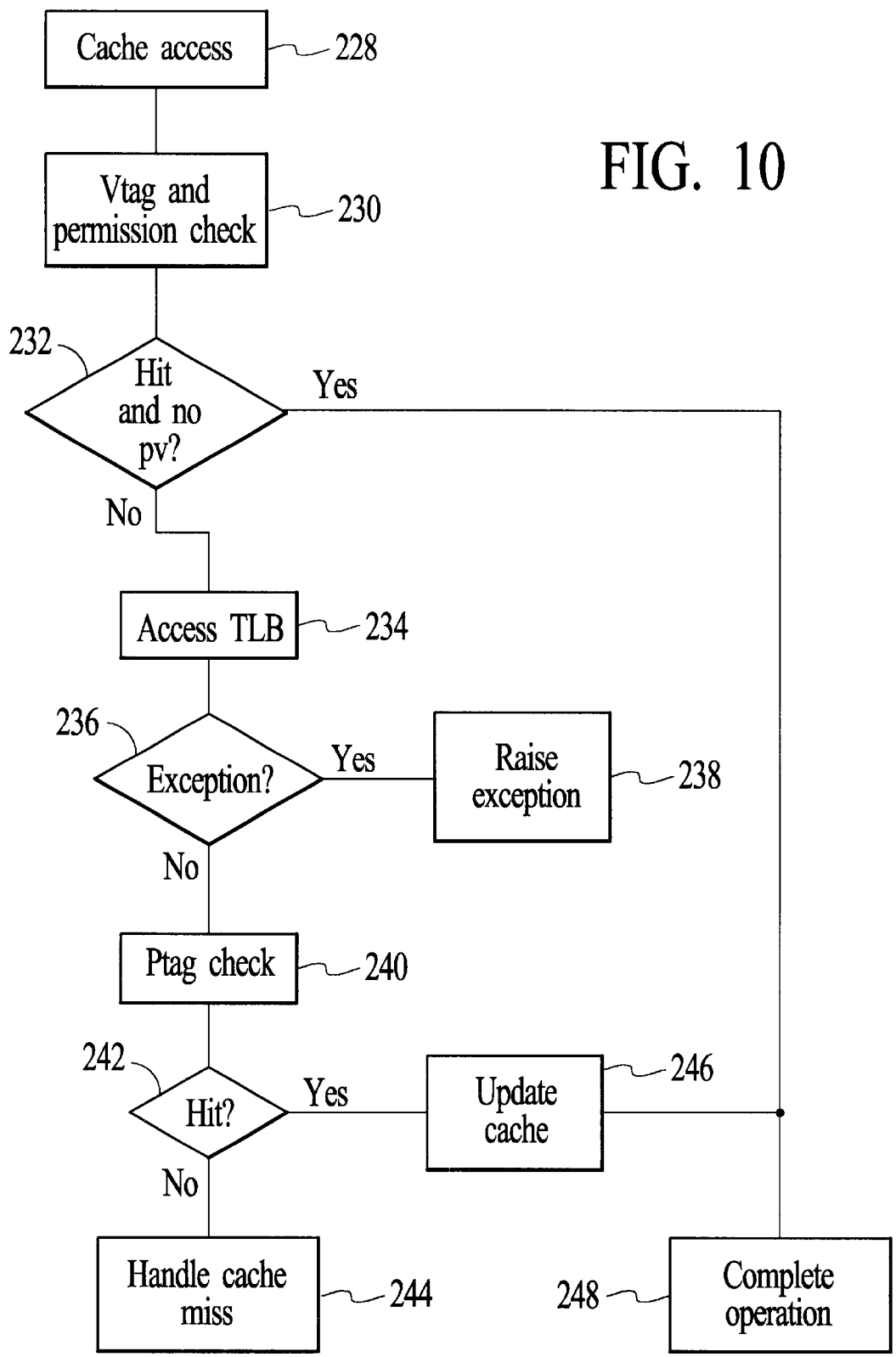
FIG. 10 is another flow diagram illustrating a second exemplary process flow for widening permission and resolving synonyms/aliasing in a virtual cache in accordance with preferred embodiments of the present invention.

Such "permission widening" also may be used more generally in the context of a virtual cache, and in particular in combination with a process to address the synonym problem as described elsewhere herein. Referring now to FIG. 10, an exemplary flow diagram for a permission widening process used in certain preferred embodiments of the present invention employing a virtual cache will now be described.

At step 228, the virtual cache is accessed, such as for purposing of processing a read request or write request. At step 230, a check/comparison is made between the virtual address for the read or write request (or a portion thereof) and the vtag of the virtual cache, and the permission level of the request of that the selected entry of the virtual cache. At step 232, a determination is made as to if there was a vtag hit and no protection violation, then the process proceeds to step 248, which the operation is completed. If, however, there was not a vtag hit, or if there was a vtag hit but a protection violation, then the next step is an access of the TLB (step 234). At step 236, a determination is made whether an exception should be taken, such as for TLB miss or for protection violation (if an exception should be taken, e.g., TLB miss or protection violation, then an exception is raised at step 238). If no exception is raised at step 236, then a check is made at step 240 whether there is a ptag hit (i.e., a comparison is made between physical address information from the TLB and the ptags of the entries of the virtual cache where a synonym made be stored). At step 242, if it is determined that there was no match or coincidence between the physical address from the TLB and the selected (selected by the index) entry of the cache (multiple entries in the case of a nway set associative cache), then at step 244 the operation is handled as a cache miss. If at step 242 it is determined that there was a match or coincidence, then at step 246 the vtag of the matched cache entry is updated with the virtual address from the TLB. Also at step 246, the permission bits/field of the cache entry also is updated. Thus, after step 246, the permission may be widened and/or the vtag entry updated after the TLB access at step 234, thereby resolving a synonym problem (if necessary) and widening permission (if necessary), and avoiding an unnecessary exception, etc. At step 248 the operation is completed (e.g., processed as a memory read or write, as appropriate). At step 248, the operation is completed by, in the case of the write operation, data is written into the selected cache entry, which may be a write through or write back operation (such as described elsewhere herein). In the case of a read operation is read from the selected cache entry.

It should be noted that the step of rewriting the vtag entry is performed so that a subsequent access using the same address as the current access will hit the cache with vtag array access. Based on locality of reference considerations, it is likely that the next access to data will be made through the same virtual address (alias) as the previous access, hence the foregoing process will optimize performance in preferred embodiments.

It also should be noted that the permission widening described herein also may be applied to instruction caches as well. For example, permissions such as executability or user/privilege permissions may be widened with the algorithms set forth above (particularly, the algorithm discussed in connection with FIG. 9). In such instruction cache embodiments, there preferably is no hardware action to remove aliases (i.e., no ptag look-up), and there is no need to provide cache coherency for the construction cache (cache coherency is discussed elsewhere). Such considerations enable the instruction cache and its controller to be implemented with simplified logic and at lower cost, etc.

Figure 11:
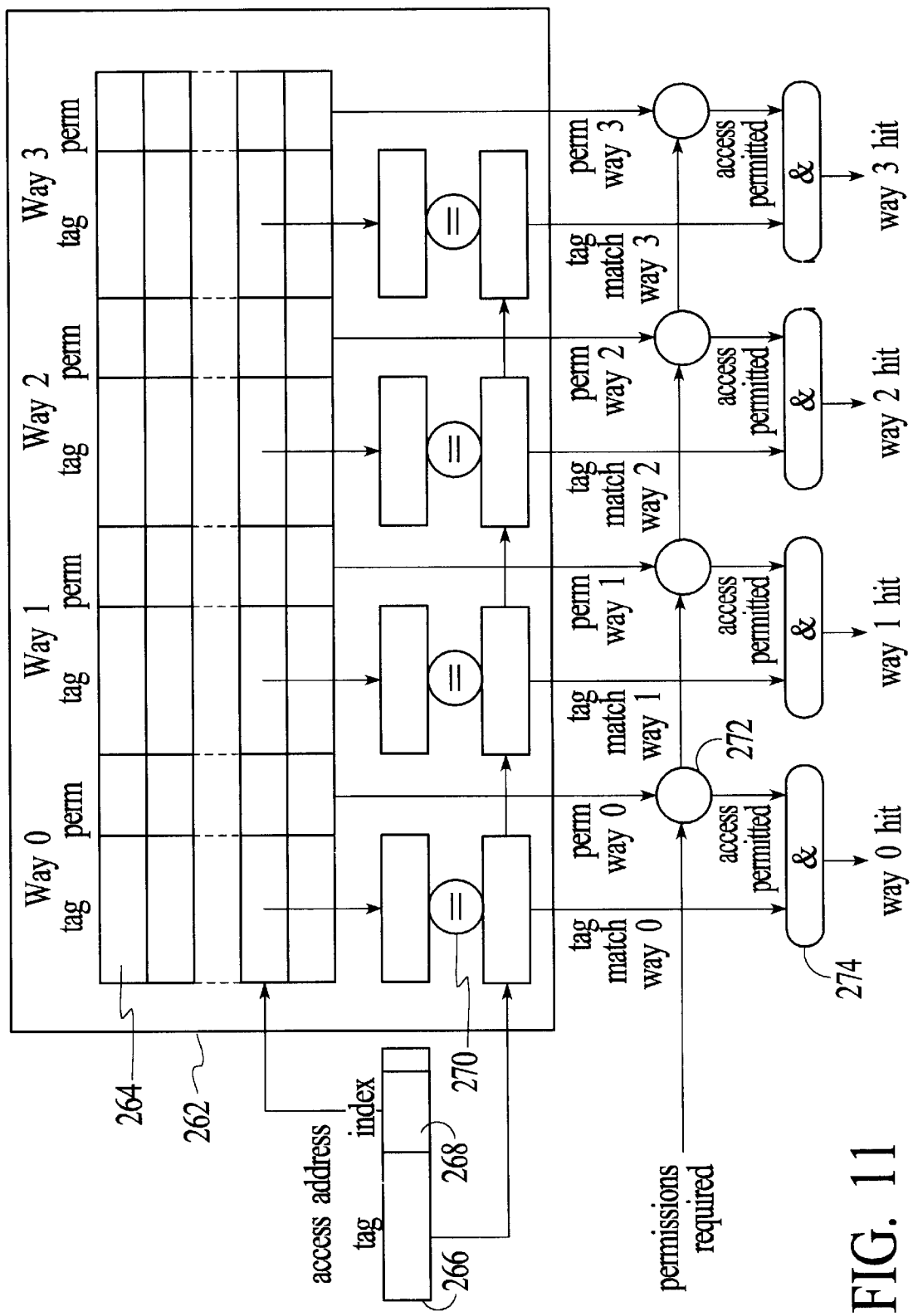
FIG. 11 is a diagram illustrating vtag comparisons and permission checking in accordance with preferred embodiments of the present invention.

Referring now to FIG. 11, certain aspects of the handling of permissions in preferred embodiments of the present invention will be described in greater detail. In FIG. 11, virtual cache array 262 illustrates the vtag arrays and permission fields/bits in an exemplary 4-way set associative virtual cache (other fields of the virtual cache entries are not shown in FIG. 11, but are described elsewhere herein). Each set of virtual cache array 262 consists of a number of sets, each of which contains four ways in the illustrated embodiment. For each set and way there is stored the virtual tag of the address whose data is stored in that set and way and also the permissions information obtained from the TLB when the line/block was placed in the cache. As more fully described elsewhere herein, permissions information may consist of read/write permission, user/privileged mode permission, etc.

For purposes of accessing virtual cache array 262, a virtual access address (such as from CPU 102) is provided to the virtual cache, which includes a virtual address tag field 266 and an index field 268 (other bits, depending upon word size, may be used to select a particular word or byte, etc., being accessed from the line/block in the cache, and may be ignored for this discussion). Index 268 is used to select/index into a set of the sets 264 of virtual cache array 262 (again, for exemplary purposes, a 4-way set associative virtual cache is illustrated in FIG. 11). The four ways of the selected/indexed entry in virtual cache array 262 preferably are read out of array 262, and then are compared with the tag field 266 of the virtual address (item 270 illustrates a buffer holding the selected/indexed vtag of one of the ways and a buffer holding the tag portion 266, which are compared preferably with a comparator). The results of the four comparisons are conveyed to AND logic 274, preferably in parallel through 4 tag match signals (AND logic 274 may consist of an AND or NAND gate, or other suitable logic, etc.).

In addition, permissions information associated with each of the ways of the selected set is provided to logic 272. Permissions required information also is provided to logic 272. As described more fully elsewhere herein, the load/store unit of CPU 102 (or other appropriate portion of CPU 102) determines the required permissions for the particular requested access. For example, a load operation requires read permission and store operation requires write permission; user mode permission is required if the instruction executes from user mode (e.g., determined from the SR.MD bit, as described elsewhere herein).

Referring again to FIG. 11, logic 272 combines the permission bits returned from cache array 262 with the permissions information from the CPU. Logic 272 determines, based on the permissions information from the CPU, whether access is permitted for each way of the selected/indexed set of ways. Access may not be permitted, for example, because of a permissions violation such as write to a read only page, read to a non-readable page, or the page is privilege only and the mode is user, etc. Logic 272 produces a signal for each way that indicates if access is permitted for that way. Logic 272 may consist of any suitable logic for receiving the permissions/permissions required-type information from the CPU and logically determining, based on the permissions information from the ways of the cache, whether access is permitted.

AND logic 274 then logically ands the tag match signal for each way output from array 262 with the access permitted signals to result in a cache hit signal for each way. As a result, in preferred embodiments, a cache hit signal is generated for a given way if the address tag matches the tag in the cache way, and the permissions information for that way indicate that the operation is permitted and (preferably) can be completed on the basis of the virtual tag access only.

Figure 12:
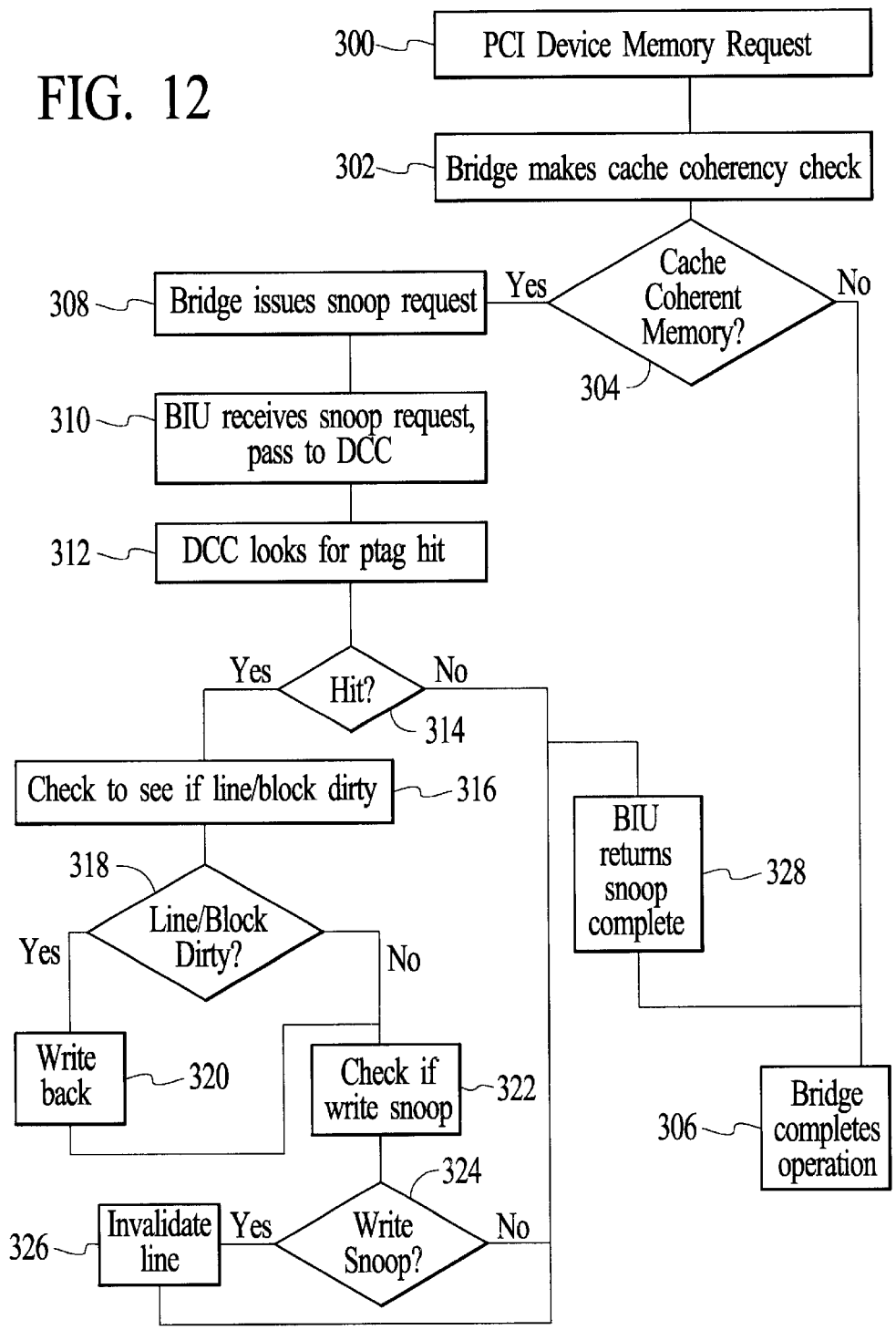
FIG. 12 is a flow diagram illustrating a process of maintaining cache coherency in a virtual cache memory system in response to externally-supplied snoop-type commands in accordance with preferred embodiments of the present invention.

Referring now to FIG. 12, a further description will be provided of a virtual cache memory system that desirably responds to externally-supplied cache coherency/snoop commands.

FIG. 1 illustrates an overall microprocessor/data processing system, in which external devices 128, which may be PCI bus or other type peripheral devices (e.g., graphics or other display modules, network interface devices, storage devices, etc.), are coupled to interface 118 (in preferred embodiments, a PCI-type interface, although other interfaces are used in other embodiments) via bus 124. External device 128 may desire to access, either read or write, external memory 126 coupled to external memory interface 120 via memory bus 122. With such memory transactions, however, problems with cache coherency may arise. If external device 128 desires to access memory locations that may be stored in the cache memory system, errors may result if the data stored in external memory 126 accessed by external device 128 are not consistent with the data stored in the cache memory.

In preferred embodiments, this problem preferably is addressed by way of a virtual cache memory that desirably responds to externally-provided (external with respect to CPU core 102, and the virtual cache memory system, etc.) "snoop" or other cache coherency commands. Generally speaking, when an external device (such as external device 128) initiates a memory access transaction, PCH bridge 114 (or other suitable interface or other device) determines whether the memory access transaction will affect areas of memory that are to be cache coherent. In preferred embodiments, some areas of memory may be designated a non-cache coherent (e.g., uncached), and thus such areas of memory will not raise cache coherency concerns. If, however, it is determined that the requested memory transaction will affect cache coherent areas of memory, then a snoop or other cache coherency command is supplied to CPU core 102. In response to the snoop or other cache coherency command, the virtual cache system initiates a process to ensure that cache coherency is maintained (e.g., initiates memory write back of data from the cache memory if the data is "dirty"), which thereafter results in a signal that acknowledges that the external/main memory and cache memory are cohered, so that the originally-requested memory transaction may be completed.

FIG. 12 is an exemplary flow diagram for such a cache coherency process utilized in preferred embodiments of the present invention. At step 300, an external device, in this example a PCI-type device (although the present invention is not limited to such devices) makes a memory request. This is received as a read or write request, along with address information necessary to respond to the request, by bridge 114. At step 302, bridge 114 references internal registers, memory or other resources for purposes of being able to determine if the request may involve cache coherent memory. It should be noted that, in preferred embodiments, it is not necessarily bridge 114 that make such a check; other interface or memory transaction processing devices, etc., may also make such a determination external to CPU core 102 and the virtual cache memory system. The particular bus and overall system depicted in FIG. 1 being only exemplary with respect to the preferred embodiment of the virtual cache memory system of the present invention.

At step 304, a determination is made as to whether the request will involve cache coherent memory; if no, the process proceeds to step 306 for completion of the originally requested operation (the transition may be implemented by the bridge or other controlling device initiating the required bus protocols, etc., in order to complete the originally-requested memory transaction); if yes, then at step 308 bridge (or other controlling device) issues a snoop command (or other cache coherency-type command) to CPU core 102.

The precise nature of the command, and the bus protocol for providing the command, may be selected based on the particular system and implementation. What is important is that an externally-provided snoop or other cache coherency command be provided to CPU core 102. In FIG. 12 this is illustratively referred to as a "snoop request."

CPU core 102 preferably includes a bus interface unit (BIU) or other interface circuitry for providing data to or from bus 104, and at step 310 the BIU of CPU core 102 receives the snoop request, which is then passed to the data cache controller (illustratively referred to as "DCC" in FIG. 12). It should be noted that the specific implementation of the BIU and the DCC may be selected for the particular application, and the virtual cache embodiments being discussed are not limited to any particular type of interface circuit or controlling circuitry. What is important is that CPU core 102 receive the snoop request and appropriate controlling circuitry for the virtual cache memory system receive the snoop request (and any other appropriate control and address information, etc.) in order to respond to the request in the manner described herein.

At step 312, the virtual cache memory receives information from the DCC, including physical address tag information (ptag), then looks for a ptag hit with the contents of the virtual cache ptag array. The performance of step 312 is preferably conducted in the following manner. The DCC takes the index field of the physical address and uses this index, or creates an index from the physical address index, in order to properly index into the ptag array of the virtual cache. Depending upon the page size and other specifics of the particular embodiment, the DCC may need to apply one, two, four oe more indexes to the virtual cache to look for the ptag hit. What is important is that, based on the physical address information accompanying the snoop request, all locations of the ptag array where a hit might be found are searched for the hit, and the DCC uses one or more indexes into the ptag array, as required, to conduct this search of the ptag array. At the conclusion of step 312, the ptag array of the virtual cache has been searched in all of the ptag locations where a hit might be found.

It should be noted that one of the properties of the ptag search as described herein and as used in preferred embodiments is that either zero or one hits will be found. In preferred embodiments there cannot be more than one, which is achieved by a combination of hardware and software mechanisms as described elsewhere herein. Hardware preferably ensures that there are no aliases of a physical address within the same set (i.e., ptag look-up and check mechanism), and software ensures that there are no aliases of a physical address between different sets (i.e., software constraint to avoid cache synonyms). As a result, implementing cache coherency as in preferred embodiments only requires the flushing/invalidation of, at most, one cache line/block. In preferred embodiments, this simplifies the hardware considerably as there is no requirement to iterate through a large number of cache lines in order to perform the appropriate flushing/invalidation.

At step 314, a determination of whether there was a ptag hit based on the ptag checks/comparisons of step 312 (of course, in particular embodiments steps such as 312 and 314 may be combined, but are shown separate primarily for discussion purposes, etc.). If at step 314 it was determined that there was not a ptag hit, then the process proceeds to step 328 (step 328 will be discussed in greater later). If at step 314 it was determined that there was a ptag hit, then the process proceeds to step 316, at which point a check is made to determine if the selected cache line/block is dirty (i.e., whether the line/block in which the ptag hit may have data that should be written to main memory). At step 318, based on the line/block dirty check and determination (again such checks and determinations generally may be a combined or separate operation, etc.), the process will proceed directly to step 322 (if the line/block is not dirty), or the process will first proceed to step 320, at which point the DCC (or other appropriate control logic) causes the data in the dirty cache line/block to be written to memory.

At step 322 a check is made of whether the snoop request is for a write operation. If the snoop request is for a write operation (a yes determination at step 324), then at step 326 the line/block of the cache hit by the ptag (assuming that there was a ptag hit) is invalidated, as the contents of the cache line/block likely will not contain the most current data upon conclusion of the originally-requested write operation. If there was no ptag hit determined at step 314, then step 322 alternatively may be skipped, with the process proceeding directly to step 328. What is important here is that, in the case of memory write operations, the virtual cache system invalidates the cache line if required to ensure coherency based on the memory write operation.

At step 328, preferably (after receipt of appropriate status information from the virtual cache, etc.) the BIU of CPU core 102 returns a snoop complete signal, or other suitable signal, that indicates to bridge 114 (or other control device) that the snoop operation has been completed, and that the cache and memory are cohered for the originally-requested memory transaction. Preferably, this signal may consist of a signal, without carrying data, that the cache and memory are cohered. In effect, a signal is returned of "all clear" or "ready to proceed" in order to signal the bridge or other devices that the originally-requested memory transaction may be completed. At step 306, the originally-requested memory transaction is completed (e.g., responsive to the "all clear" or "ready to proceed" signal).

In accordance with the present invention, certain exemplary methods that may be performed in accordance with certain preferred embodiments will now be described. In a data processing system executing instructions and storing and receiving data from a memory having locations in a memory space, the data processing system also having a cache memory, the cache memory having a number of entries, wherein the entries of the cache memory are in locations in a register space separate from the memory space, a method in accordance of the present invention may consist of the steps of:

A. executing a first instruction to obtain address information from at least one entry of the cache memory, wherein the first instruction operates only on locations in register space but not on locations in memory space;

B. comparing the obtained address information with target address information;

C. if the comparison between the obtained address information and the target address information results in a correspondence, then a first operation is performed on the at least one entry of the cache memory; and D. if the comparison between the obtained address information and the target address information does not result in a correspondence, then the first operation is not performed on the at least one entry of the cache memory;

wherein management operations are performed on the cache memory without using locations in memory space.

In the foregoing method, the first operation may be an invalidate, flush or purge operation. In the foregoing method, steps A through D may be performed in a loop, wherein a plurality of the entries of the cache memory are accessed, wherein the first operation is performed on a subset of the entries of the cache memory that have a common characteristic. In the foregoing method, the common characteristic may be having an address associated with a common area of memory, which may be a page of memory. In the foregoing method, the address information may be physical address information. In the foregoing method, the cache memory may be a virtual cache memory having a plurality of entries, each of the entries of the virtual cache memory including physical address information, logical address information, wherein the obtained address information is logical address information or physical address information.

In the foregoing method, the data processing system also may include a translation lookaside buffer having a number of entries, wherein the entries of the translation lookaside buffer are in locations in a register space separate from the memory space. In the foregoing method, the entries of the translation lookaside buffer are in locations in the same register space as the entries of the cache memory. In the foregoing method, the first instruction may contain a number of fields, wherein control of information in one or more of the fields controls whether entries of the translation lookaside buffer or entries of the cache memory are accessed upon execution of the first instruction. In the foregoing method, the first instruction may be a GET instruction for reading information from entries of the translation lookaside buffer or the cache memory. In the foregoing method, the first operation may be performed by execution of a second instruction, wherein the second instruction contains a number of fields, wherein control of information in one or more of the fields controls whether entries of the translation lookaside buffer or entries of the cache memory are accessed upon execution of the second instruction. In the foregoing method, the second instruction may be a PUT instruction for writing information to entries of the translation lookaside buffer or the cache memory. In the foregoing method, the first operation may be an operation for demapping (e.g., flushing) the entries of the cache memory, or changing the permission information, where the permission information is changed to narrow the permission.

In a data processing system executing instructions and storing and receiving data from a memory having locations in a memory space, the data processing system also having a instruction cache memory, the instruction cache memory having a number entries, wherein the entries comprise a number of sets (nsets), where each of the sets comprise a number of ways (nways), a method in accordance with the present invention may consist of the following steps:

A. executing one or more first instructions to load one or more instructions into a first way of the instruction cache memory;

B. executing one or more second instructions to lock the first way of the instruction cache memory; and C. executing a sequence of instructions including the one or more instructions loaded in the first way of the instruction cache memory, wherein it is predetermined that the one or more instructions loaded in the first way of the instruction cache memory will be executed without retrieving the one or more instructions from the memory during execution of the sequence of instructions.

In the foregoing method, the instruction cache memory may be controlled by a control register in a register space separate from the memory space, wherein the one or more second instructions is/are a PUT instruction for writing information to the control register, wherein the written information controls the locking of the instruction cache memory. In the foregoing method, the number of ways may be a number greater than 1. In the foregoing method, while the first way is locked, one or more other ways are unlocked and available for caching instructions. In the foregoing method, nsets may be a number greater than one. In the foregoing method, step A may be performed after step B. In the foregoing method, the one or more second instructions may control that the first way is to be locked and that the first way is to be used for loading instructions.

In a data processing system executing instructions and storing and receiving data from a memory having locations in a memory space, the data processing system also having a data cache memory, the data cache memory having a number entries, wherein the entries comprise a number of sets (nsets), where each of the sets comprise a number of ways (nways), a method in accordance with the present invention may consist of the following steps:

A. executing one or more first instructions to load data into one or more locations of a first way of the data cache memory;

B. executing one or more second instructions to lock the first way of the data cache memory; and C. executing a sequence of instructions including one or more instructions that will access the one or more locations in which data was loaded in the first way of the data cache memory, wherein it is predetermined that the one or more locations for the data loaded in the first way of the instruction cache memory will be accessed during execution of the sequence of instructions without a cache miss.

In the foregoing method, the data cache memory may be controlled by a control register in a register space separate from the memory space, wherein the one or more second instructions is/are a PUT instruction for writing information to the control register, wherein the written information controls the locking of the data cache memory. In the foregoing method, the number of ways is a number greater than 1. In the foregoing method, while the first way is locked, one or more other ways may be unlocked and available for caching data. In the foregoing method, nsets may be a number greater than one.

In a data processing system executing instructions and storing and receiving data from a memory having locations in a memory space, the data processing system also having a cache memory, the cache memory having a number entries, wherein the entries comprise. a number of sets (nsets), where each of the sets comprise a number of ways (nways), a method in accordance with the present invention may consist of the following steps:

A. executing one or more first instructions to load data or instructions into one or more locations of a first way of the cache memory;

B. executing one or more second instructions to lock the first way of the cache memory; and C. executing a sequence of instructions including one or more instructions that will access the one or more locations in which data or instructions were loaded in the first way of the cache memory, wherein it is predetermined that the one or more locations for the data or instructions loaded in the first way of the cache memory will be accessed during execution of the sequence of instructions without a cache miss.

In the foregoing method, the cache memory may be controlled by a control register in a register space separate from the memory space, wherein the one or more second instructions is/are a PUT instruction for writing information to the control register, wherein the written information controls the locking of the cache memory. In the foregoing method, the number of ways may be a number greater than 1. In the foregoing method, while the first way is locked, one or more other ways may be unlocked and available for caching data. In the foregoing method, nsets may be a number greater than one.

In a data processing system having a virtual cache memory, the virtual cache memory having a plurality of entries, each of the entries of the virtual cache memory including physical address information and logical address information, a method in accordance with the present invention may consist of the following steps:

A. initiating a memory access operation on one or more predetermined memory locations based on physical address information associated with the memory access operation;

B. determining if the memory access operation may involve cache coherent memory;

C. if the memory access operation may involve cache coherent memory, then issuing a cache coherency command, the cache coherency command containing physical address information of the memory access operation;

D. based on the cache coherency command and the physical address information of the memory access operation, determining if there is a match between at least a portion of the physical address information of the memory access operation and at least a portion of the physical address information stored in the entries of the virtual cache;

E. if there is a match between the physical address information of the memory access operation and physical address information of a particular entry of the virtual cache memory, then determining whether data associated with the particular entry of the virtual cache memory is dirty;

F. if the data associated with the particular entry of the virtual cache memory is dirty, then initiating a write back operation, wherein data in the particular entry of the virtual cache memory is written to memory;

G. issuing a command that indicates that the virtual cache memory and the memory locations of the memory access operation are cohered; and H. completing the memory access operation.

In the foregoing method, additional steps may be determining if the memory access operation is a write operation, and if the memory access operation is a write operation, then invalidating the particular entry of the virtual cache memory. In the foregoing method, the virtual cache memory may be included in a single chip microprocessor, wherein a device external to the single chip microprocessor initiates the memory access operation. In the foregoing method, a circuit that bridges between the external device and an internal bus may receive a command from the external device to initiate the memory access operation. In the foregoing method, the circuit may store information to determine which areas of memory are cache coherent. In the foregoing method, the circuit may compare physical address information from the external device with the stored information, wherein, if the memory access information does not involve coherent memory, then the circuit initiates completion of the memory access operation without issuing the cache coherency command. In the foregoing method, in response to the cache coherency command and based on physical address information of the memory access operation, one or more indices may be formed for the virtual cache memory, wherein the one or more indices are used to search the virtual cache memory to determine if there is a match between at least a portion of the physical address information of the memory access operation and at least a portion of the physical address information stored in the entries of the virtual cache. In the foregoing method, not all entries of the virtual cache memory may be searched, wherein the indices control the searching of the entries of the virtual cache where a match may be found.

In a data processing system having a virtual cache memory and a translation lookaside buffer, the virtual cache memory having a plurality of entries, each of the entries of the virtual cache memory including physical address information, logical address information and permission information, the translation lookaside buffer having a plurality of entries, each of the entries of the translation lookaside buffer including physical address information, logical address information and permission information, a method in accordance with the present invention may consist of the following steps:

A. initiating a memory access operation on a predetermined memory location based on logical address information and permission information associated with the memory access operation;

B. accessing the virtual cache memory, and determining if there is a match between at least a portion of the logical address information of the memory access operation and at least a portion of the logical address information stored in the entries of the virtual cache;

C. if there is a match between the logical address information of the memory access operation and logical address information of a particular entry of the virtual cache memory, then determining, based on the permission information of the memory access operation and the permission information of the particular entry of the virtual cache memory, whether the memory access operation is permitted by the permission information of the particular entry of the virtual cache memory;

D. if the memory access operation is not permitted by the permission information of the particular entry of the virtual cache memory, then accessing the translation lookaside buffer based on the logical address information of the particular entry of the virtual cache memory;

E. if there is a match between the logical address information of the particular entry of the virtual cache memory and the logical address information of a particular entry of the translation lookaside buffer, then determining, based on the permission information of the memory access operation and the permission information of the particular entry of the translation lookaside buffer, whether the memory access operation is permitted by the permission information of the particular entry of the translation lookaside buffer;

F. if the memory access operation is permitted by the permission information of the particular entry of the translation lookaside buffer, then updating the permission information of the particular entry of the virtual cache memory based on the permission information of the particular entry of the translation lookaside buffer; and G. completing the memory access operation.

In the foregoing method, after step D, if there is not a match between the logical address information of the particular entry of the virtual cache memory and the logical address information of a particular entry of the translation lookaside buffer, then a translation lookaside buffer miss operation may be performed. In the foregoing method, after step C, if the memory access operation is permitted by the permission information of the particular entry of the virtual cache memory, then the memory access operation may be completed. In the foregoing method, the permission information of the particular entry of the virtual cache memory may be widened based on the permission information of the particular entry of the translation lookaside buffer. In the foregoing method, the operation may be completed without performing a permission violation operation.

In the foregoing method, a step H may be performed: after step C, if there is not a match between the logical address information of the memory access operation and logical address information of a particular entry of the virtual cache memory, then the translation lookaside buffer may be accessed based on the logical address information of the memory access operation; and a step I may be performed: if there is a match between the logical address information of the memory access operation and a particular entry of the translation lookaside buffer, then it may be determined if there is a match between physical address information of the particular entry of the translation lookaside buffer and physical address information of a particular entry of the virtual cache memory; and a step J may be performed: if there is a match between the physical address information of the particular entry of the translation lookaside buffer and the physical address information of a particular entry of the virtual cache memory, then the logical address information of the particular entry of the virtual cache memory may be updated with logical address information of the particular entry of the translation lookaside buffer.

In the foregoing method, the steps the accessing of the translation lookaside buffer in steps D and H may be performed together with a single access of the translation lookaside buffer. In the foregoing method, the condition of two logical addresses having the same physical address may be detected, wherein the memory access operation is completed without performing a cache miss operation. In the foregoing method, the memory access operation may be a memory write operation, wherein the permission information of the particular entry of the virtual cache memory initially indicates that the memory write operation is not permitted, wherein the particular entry of the translation lookaside buffer initially indicates that the memory write operation is not permitted, and the method may also include the steps of: performing an operation to determine if the memory write operation was a first memory write operation to a particular page of memory that includes the predetermined memory location; and updating the permission information of the particular entry of the translation lookaside buffer. In the foregoing method, steps A through G may be repeated for the memory write operation, wherein the permission information of the particular entry of the virtual cache memory is updated and the memory write operation is completed.

Also in the foregoing method, after step E, if the memory access operation is not permitted by the permission information of the particular entry of the translation lookaside buffer, then a permission violation exception may be raised.

As will be appreciated, with such virtual cache memory preferred embodiments, externally-supplied snoop-type commands may be processed, such as using ptag comparisons based on physical address information provided with the snoop-type command, in a manner such that the cache and memory may be desirably cohered.

While the present invention has been described in terms of preferred and alternative embodiment, it will be obvious to one skilled in the art that many alternations and modifications may be made without substantially departing from the spirit of the invention. Accordingly, it is intended that all such alternations and modifications be included in the spirit and scope of the invention as defined by the appended claims.

What is claimed is:

1. In a single chip microprocessor having a CPU with a virtual cache memory, the virtual cache memory having a plurality of entries, each of the entries of the virtual cache memory including physical address information and logical address information, the single chip microprocessor also having a bridge circuit coupled between an internal bus and an external bus, a method comprising the steps of:

A. initiating a memory access operation from an external device coupled to the external bus on one or more predetermined memory locations based on physical address information associated with the memory access operation;

B. determining via the bridge circuit if the memory access operation may involve cache coherent memory;

C. if the memory access operation may involve cache coherent memory, then issuing a cache coherency command from the bridge circuit to the CPU, the cache coherency command containing physical address information of the memory access operation;

D. based on the cache coherency command from the bridge circuit and the physical address information of the memory access operation, determining via the CPU if there is a match between at least a portion of the physical address information of the memory access operation and at least a portion of the physical address information stored in the entries of the virtual cache memory;

E. if there is a match between the physical address information of the memory access operation and physical address information of a particular entry of the virtual cache memory, then determining via the CPU whether data associated with the particular entry of the virtual cache memory is dirty;

F. if the data associated with the particular entry of the virtual cache memory is dirty, then initiating via the CPU a write back operation, wherein data in the particular entry of the virtual cache memory is written to memory;

G. issuing a command from the CPU to the bridge circuit that indicates that the virtual cache memory and the one or more memory locations of the memory access operation are cohered; and H. completing via the bridge circuit the memory access operation.

2. The method of claim 1, further comprising the steps of:

determining if the memory access operation is a write operation; and if the memory access operation is a write operation, then invalidating the particular entry of the virtual cache memory.

3. The method of claim 1, wherein the device external to the single chip microprocessor that initiates the memory access operation comprises a PCI device.

4. The method of claim 3, wherein the bridge circuit receives a command from the external device to initiate the memory access operation.

5. The method of claim 4, wherein the bridge circuit stores information to determine which areas of memory are cache coherent.

6. The method of claim 5, wherein the bridge circuit compares physical address information from the external device with the stored information, wherein, if the memory access information does not involve cache coherent memory, then the bridge circuit initiates completion of the memory access operation without issuing the cache coherency command.

7. The method of claim 1, wherein, in response to the cache coherency command and based on physical address information of the memory access operation, one or more indices are formed for the virtual cache memory, wherein the one or more indices are used to search the virtual cache memory to determine if there is a match between at least a portion of the physical address information of the memory access operation and at least a portion of the physical address information stored in the entries of the virtual cache memory.

8. The method of claim 7, wherein not all entries of the virtual cache memory are searched, wherein the indices control the searching of the entries of the virtual cache memory where a match may be found.

9. The method of claim 1, wherein the CPU includes a bus interface unit coupled to the internal bus.

10. The method of claim 9, wherein the bus interface unit receives the cache coherency command from the bridge circuit.

11. The method of claim 10, wherein the cache coherency command comprises a snoop request.

12. The method of claim 10, wherein the bus interface unit is coupled to a cache controller circuit, wherein the cache controller circuit is coupled to the virtual cache memory.

13. The method of claim 12, wherein the cache controller circuit receives the cache coherency command from the bus interface unit and accesses the virtual cache memory, wherein the cache coherency command is processed.

14. The method of claim 9, wherein the command issued in step G comprises a signal provided from the bus interface unit to the bridge circuit.

15. The method of claim 14, wherein the signal comprises a snoop complete signal.

16. The method of claim 14, wherein the signal indicates a ready-to-proceed condition for the memory access operation.

17. The method of claim 1, wherein step D returns either zero or one matches.

18. The method of claim 17, wherein hardware of the single chip microprocessor ensures that there are no aliases of a physical address within a same set in the virtual cache memory.

19. The method of claim 17, wherein software executed by the single chip microprocessor ensures that there are no aliases of a physical address between different sets in the virtual cache memory.

20. The method of claim 17, wherein hardware of the single chip microprocessor ensures that there are no aliases of a physical address within a same set in the virtual cache memory, wherein software executed by the single chip microprocessor ensures that there are no aliases of a physical address between different sets in the virtual cache memory.

* * * * *